US005753017A

United States Patent [19]

Onodera et al.

[11] Patent Number: 5,753,017

[45] Date of Patent: May 19, 1998

[54] INK JET RECORDING INK AND RECORDING METHOD EMPLOYING THE SAME

[75] Inventors: Akira Onodera; Hidetaka Ninomiya; Hidenobu Ohya; Daisuke Ishibashi; Tawara Komamura; Katsunori Katoh; Tatsuo Tanaka; Hitoshi Morimoto, all of Hino, Japan

[73] Assignee: Konica Corporation, Japan

[21] Appl. No.: 728,772

[22] Filed: Oct. 11, 1996

[30] Foreign Application Priority Data

Oct. 16, 1995 [JP] Japan ..................... 7-267082
Mar. 27, 1996 [JP] Japan ..................... 8-072287

[51] Int. Cl.$^6$ ..................... C09D 11/02

[52] U.S. Cl. ..................... 106/31.49; 106/31.47; 106/31.57

[58] Field of Search ..................... 106/20 D, 22 H, 106/31.47, 31.48, 31.57; 544/235, 238, 239, 241; 546/113, 275.4, 275.7; 548/373.1, 374.1, 375.1

[56] References Cited

U.S. PATENT DOCUMENTS

| | | | |
|---|---|---|---|
| 5,210,200 | 5/1993 | Shimada et al. | 548/303.1 |
| 5,374,601 | 12/1994 | Takiguchi et al. | 503/227 |

FOREIGN PATENT DOCUMENTS

| | | |
|---|---|---|
| 0271063A2 | 6/1988 | European Pat. Off. . |
| 002024184 | 10/1991 | European Pat. Off. . |
| 0512548A1 | 11/1992 | European Pat. Off. . |
| 0518238A1 | 12/1992 | European Pat. Off. . |
| 0616898A2 | 9/1994 | European Pat. Off. . |
| 186567 | 9/1985 | Japan . |
| 231975 | 10/1991 | Japan . |

*Primary Examiner*—Helene Klemanski
*Attorney, Agent, or Firm*—Jordan B. Bierman; Bierman, Muserlian and Lucas

[57] ABSTRACT

A recording method comprising the step of ejecting an ink jet recording ink on an ink receiving material using an ink jet printer, the ink comprising a dye represented by the following Formula (1):

Formula (1)

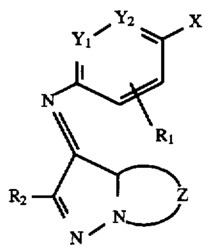

3 Claims, 4 Drawing Sheets

INK JET RECORDING INK AND RECORDING METHOD EMPLOYING THE SAME

FIELD OF THE INVENTION

The present invention relates to an ink jet recording ink containing a specific dye, and specifically relates to an ink jet recording ink excellent in color tone and color image fastness.

BACKGROUND OF THE INVENTION

An ink jet recording system is generally divided into methods wherein solution drops are ejected due to pressure by electrical-mechanical conversion of a Piezo element, methods wherein solution drops are ejected due to pressure by generating bubbles by electrical-heat conversion and methods wherein solution drops are ejected by electrostatic force In an ink for ink jet, to be suitable for any recording system selected from above, to have high recording image density and also have favorable color tone, to be excellent in color image fastness such as light fastness, heat resistance and water proofing, to be speedy in terms of fixing on a recording medium and not to blur after recording, to be excellent in terms of storage stability as an ink, to have no inherent safety problems such as toxicity and flammability and to be inexpensive are demanded.

From the above-mentioned viewpoints, various ink jet recording inks have been disclosed and studied. However, recording inks satisfying most of aforesaid requirements concurrently are extremely rare.

In color images recording employing yellow, magenta, cyan and black, dyes and pigments having conventional C.I. numbers described in the C.I. Index have been studied extensively. Specifically, in magenta inks, xanthene types such as C.I. Acid Red 52 and azo type water-solubilizing dyes such as C.I. Direct Red 20 are common. However, the former ones have problem in terms of color image fastness such as light fastness and the latter ones have problems in terms of spectral absorption properties related to color reproducibility such as lacking in sharpness of magenta color tone.

Compared to dye compounds employing a conventional pyrazolone-containing compound as a coupler, dye compounds employing a pyrazole condensed ring containing compound as a coupler is specifically effective as an image forming dye having little unnecessary absorption. Excellent properties of a magenta coupler for silver halide photographic light-sensitive material is disclosed in Japanese Patent Publication Open to Public Inspection (hereinafter, referred to as Japanese Patent O.P.I. Publication) Nos. 23434/1983, 45512/1983 and 142801/1983.

Practicality of the dye itself is disclosed in Japanese Patent O.P.I. Publication Nos. 186567/1985, 9381/1992 and 202261/1992, while application of aforesaid dye compounds to the ink jet recording methods is disclosed in Japanese Patent O.P.I. Publication No. 231975/1991.

However, even if the above-mentioned compounds obtained through a coupling reaction between a pyrazole condensed ring containing compound disclosed therein and a paraphenylenediamine-containing compound oxidized product was used as a dye for image forming, the level of its unnecessary sub-absorption and light fastness were not necessarily satisfactory.

SUMMARY OF THE INVENTION

An object of the invention is to provide an ink jet recording ink, particularly an ink jet recording ink for magenta, giving a color image with excellent light fastness and an excellent color tone for color reproduction.

Another object of the invention is to provide a water based ink jet recording ink capable of being employed during a long term, giving a color image with excellent light fastness and an excellent color tone.

DETAILED DESCRIPTION OF THE INVENTION

Figure 1:
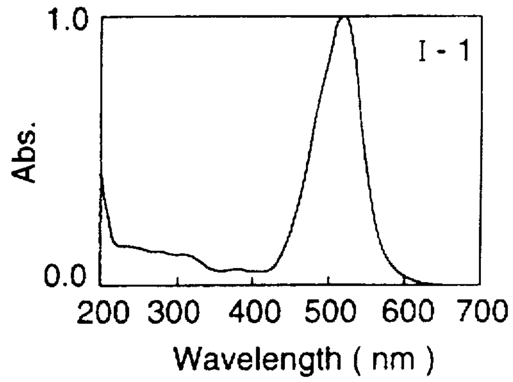
FIG. 1 shows visible and ultraviolet absorption spectra of an Exemplified Compound I-1 methanol solution.

The present inventors have made an extensive stydy, and the above problems of the invention can be solved by the following constitution:

1. An ink jet recording ink and an ink jet recording method employing the same, the ink comprising a dye represented by the following Formula (1):

Formula (1)

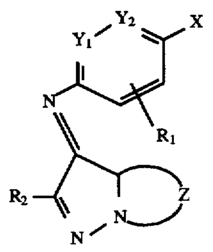

In Formula (1), X represents $—NR_3R_4$ or —OH, in which $R_3$ and $R_4$ may be the same or different and independently represent a hydrogen atom, an alkyl group, an alkenyl group, an alkinyl group, an aryl group, an aralkyl group, a cycloalkyl group or a heterocyclic group, each of which may have a substituent, or $R_3$ and $R_4$ combine with each other to form a ring; $Y_1$ and $Y_2$ independently represent CR or nitrogen, in which R represents a hydrogen atom, a substituted or unsubstituted alkyl group or an acylamino group, provided that at least one of $Y_1$ and $Y_2$ is nitrogen; Z represents an atomic group necessary to form a 5- or 6-membered nitrogen containing heterocyclic ring which may have an alkyl group, an alkenyl group, an alkinyl group, a cycloalkylgroup, a cyano group, an alkoxy group, an aryl group, an aryloxy group, an aralkyl group, an alkylsulfinyl group, an acylamino group, a sulfonylamino group, a ureido group, an alkylthio group, an alkoxycarbonyl group, a carbamoyl group, an acyl group, an amino group, an alkylsulfonyl group or a sulfamoyl group, each of which may have a substituent, or may be condensed with another ring; $R_1$ represents a hydrogen atom, a halogen atom, an alkyl group, a cycloalkyl group, a cyano group, an alkoxy group, an aryl group, an aryloxy group, an aralkyl group, an alkylsulfinyl group, an acylamino group, a sulfonylamino group, a ureido group, an alkylthio group, an alkoxycarbonyl group, a carbamoyl group, an acyl group, an amino group, an alkylsulfonyl group or a sulfamoyl group, each of which may have a substituent; and $R_2$ represents a hydrogen atom, a halogen atom, an alkyl group, a cycloalkylgroup, a cyano group, an alkoxy group, an aryl group, an aryloxy group, an aralkyl group, an alkylsulfinyl group, an acylamino group, a sulfonylamino group, a ureido group, an alkylthio group, an alkoxycarbonyl group, a carbamoyl group, an acyl group, an amino group, an alkylsulfonyl group or a sulfamoyl group, each of which may have a substituent, provided that at least one of $R_2$ and the substituent on Z has a Hammett σp value of −0.3 to 1.0.

2. An ink jet recording ink and an ink recording method employing the same, the ink comprising a dye represented by the following Formula (2):

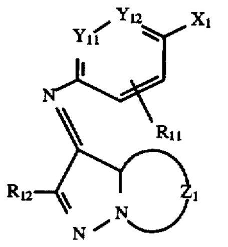

In Formula (2), $X_1$ represents —$NR_{31}R_{41}$ or —OH, in which $R_{31}$ and $R_{41}$ may be the same or different and independently represent an alkyl group, an alkenyl group, an aryl group, an aralkyl group or a cycloalkyl group, each of which may have a substituent, or a hydrogen atom, or $R_{31}$ and $R_{41}$ combine with each other to form a ring or $R_{31}$ and $R_{11}$, $R_{41}$ and $R_{11}$ each combine with each other to form a ring;

$Y_{11}$ and $Y_{12}$ independently represent $CR_1$ or nitrogen, in which $R_1$ represents a hydrogen atom, an acylamino group or $R_{31}$, provided that at least one of $Y_{11}$ and $Y_{12}$ is nitrogen; $Z_1$ represents an atomic group necessary to form a 5- or 6-membered nitrogen containing heterocyclic ring which may have a substituent or may be condensed with another ring;

$R_{11}$ represents a hydrogen atom, a halogen atom or a monovalent substituent; and $R_{12}$ represents a monovalent substituent, provided that at least one of $R_{12}$ and the substituent on $Z_1$ has a Hammett σp value of −0.3 to 1.0.

The invention will be detailed below.

The compound represented by Formula (1) will be explained.

X represents —$NR_3R_4$ or —OH, in which $R_3$ and $R_4$ may be the same or different and independently represent an alkyl group (for example, methyl, ethyl, propyl), an alkenyl group (for example, allyl), an aryl group (for example, phenyl), an aralkyl group (for example, benzyl) or a cycloalkyl group (for example, cyclohexyl, cyclopentyl), each of which may have a substituent, or $R_3$ may combine with $R_4$ to form a ring or $R_3$ may combine with $R_1$ to form a ring or $R_3$ represents —OH. It is preferable that $R_3$ and $R_4$ both are substituted or unsubstituted lower alkyl groups.

The substituent includes hydroxy, alkoxy, cyano, alkylsulfonylamino and halogen. $R_3$ and $R_4$, or $R_3$ and $R_1$ may combine with each other to form a ring.

$R_1$ represents a hydrogen atom, a halogen atom (for example, fluorine, chlorine), an alkyl group, a cycloalkyl group, a cyano group, an alkoxy group, an aryl group, an aryloxy group, an aralkyl group, an alkylsulfinyl group, an acylamino group, a sulfonylamino group, a ureido group, an alkylthio group, an alkoxycarbonyl group, a carbamoyl group, an acyl group, an amino group, an alkylsulfonyl group or a sulfamoyl group, each of which may have a substituent. $R_1$ preferably represents an alkyl group or an alkoxy group.

$R_2$ represents an alkyl group, a cycloalkylgroup, a cyano group, an alkoxy group, an aryl group, an aryloxy group, an aralkyl group, an alkylsulfinyl group, an acylamino group, a sulfonylamino group, a ureido group, an alkylthio group, an alkoxycarbonyl group, a carbamoyl group, an acyl group, an amino group, an alkylsulfonyl group or a sulfamoyl group.

Further, at least one of $R_2$ and the substituent on Z is a substituent having a Hammett σp value of −0.3 to 1.0, preferably −0.05 to 1.0. Such a substituent includes an aryl group (for example, phenyl), a halogenated alkyl group (for example, trifluoromethyl, trichloromethyl, tetrafluoroethyl), a cyano group, an alkylsulfonyl group (for example, methanesulfonyl), an alkylsulfinyl group (for example, methanesulfinyl), a sulfamoyl group (for example, diethylsulfamoyl), a carbamoyl group (for example, diethylcarbamoyl) and an alkoxycarbonyl group (for example, methoxycarbamoyl).

$Y_1$ and $Y_2$ independently represent CR or nitrogen, in which R represents a hydrogen atom, a substituted or unsubstituted alkyl group or an acylamino group, provided that at least one of $Y_1$ and $Y_2$ is nitrogen.

Z represents an atomic group necessary to form a 5- or 6-membered nitrogen containing heterocyclic ring which may have an alkyl group, a cycloalkylgroup, a cyano group, an alkoxy group, an aryl group, an aryloxy group, an aralkyl group, an alkylsulfinyl group, an acylamino group, a sulfonylamino group, a ureido group, an alkylthio group, an alkoxycarbonyl group, a carbamoyl group, an acyl group, an amino group, an alkylsulfonyl group or a sulfamoyl group, each of which may have a substituent, or may be condensed with another ring.

In Formula (1), at least one of $R_1$, $R_2$, $R_3$, $R_4$, R and the substituent on the heterocyclic ring represented by Z preferably has a group having a sulfonic acid group or its salt group or a carboxylic acid group or its salt group.

The compound represented by Formula (2) will be explained.

$X_1$ represents —$NR_{31}R_{41}$ or —OH, in which $R_{31}$ and $R_{41}$ may be the same or different and independently represent an alkyl group (for example, methyl, ethyl, propyl), an alkenyl group (for example, allyl), an aryl group (for example, phenyl), an aralkyl group (for example, benzyl) or a cycloalkyl group (for example, cyclohexyl, cyclopentyl), each of which may have a substituent or a hydrogen atom.

$R_{31}$ may combine with $R_{41}$ to form a ring or $R_{31}$ may combine with $R_{11}$ to form a ring. It is preferable that $R_{31}$ and $R_{41}$ both are substituted or unsubstituted lower alkyl groups.

The substituent includes hydroxy, alkoxy, cyano, alkylsulfonylamino and halogen. $R_{31}$ and $R_{41}$, or $R_{31}$ and $R_{11}$ may combine with each other to form a ring.

$R_{11}$ represents a hydrogen atom, a halogen atom (for example, fluorine, chlorine) or a monovalent substituent. The monovalent substituent includes an alkyl group, a cycloalkyl group, a cyano group, an alkoxy group, an aryl group, an aryloxy group, an aralkyl group, an acylamino group, a sulfonylamino group, a ureido group, an alkylthio group, an alkoxycarbonyl group, a carbamoyl group, an acyl group, an amino group, a sulfonyl group, a sulfamoyl group or an alkylsulfinyl group, each of which may have a substituent. $R_{11}$ preferably represents an alkyl group or an alkoxy group.

$R_{12}$ represents a monovalent substituent. The monovalent substituent includes an alkyl group, a cycloalkylgroup, an alkoxy group, an aryl group, an aryloxy group, an aralkyl group, an acylamino group, a sulfonylamino group, a ureido group, an alkylthio group, an alkoxycarbonyl group, a carbamoyl group, an acyl group, an amino group, an alkylsulfonyl group or a sulfamoyl group, an alkylsulfinyl group.

Further, at least one of $R_{12}$ and the substituent on a ring represented by $Z_1$ is a substituent having a Hammett σp value of −0.3 to 1.0, preferably −0.05 to 1.0. Such a substituent includes an aryl group (for example, phenyl), a halogenated alkyl group (for example, trifluoromethyl, trichloromethyl, tetrafluoroethyl), a cyano group, an alkylsulfonyl group (for example, methanesulfonyl), an alkylsulfinyl group (for example, methanesulfinyl), a sulfamoyl group (for example, diethylsulfamoyl), a carbamoyl group (for example, diethylcarbamoyl) and an alkoxycarbonyl group (for example, methoxycarbamoyl).

$Y_{11}$ and $Y_{12}$ independently represent $CR_1$ or nitrogen, in which $R_1$ represents a hydrogen atom, an acylamino group or $R_{31}$, provided that at least one of $Y_{11}$ and $Y_{12}$ is nitrogen. $Z_1$ represents an atomic group necessary to form a 5- or 6-membered nitrogen containing heterocyclic ring which may have a substituent, or may be condensed with another ring.

The dye represented by Formula (2) includes a dye represented by Formula (3) or (4):

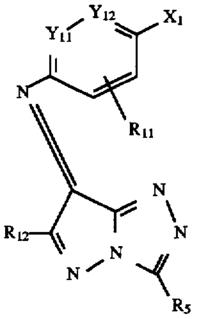

Formula (3)

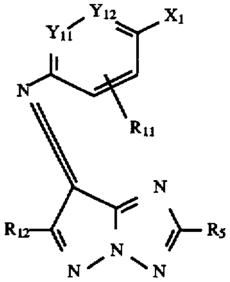

Formula (4)

In Formula (3) or (4), $R_{11}$, $R_{12}$, $X_1$, $Y_{11}$ and $Y_{12}$ independently represent the same as those denoted in Formula (2), $R_5$ represents an alkyl group, a cycloalkyl group, an alkoxy group, an aryl group, an aryloxy group, an aralkyl group, an acylamino group, a sulfonylamino group, a ureido group, an alkylthio group, an alkoxycarbonyl group, a carbamoyl group, an acyl group, an amino group, a cyano group, an alkylsulfonyl group, a sulfamoyl group or an alkylsulfinyl group. Further, at least one of $R_{12}$ and $R_5$ is a substituent having a Hammett σp value of −0.3 to 1.0, preferably −0.05 to 1.0.

Description of "Kagaku no Ryoiki", extra edittion 122, 85–121 (1980), published by Nankoudo is referred to the Hammett σp value in the invention.

The examples of the dyes represented by formulas (1) through (4) are listed below, but are not limited thereto.

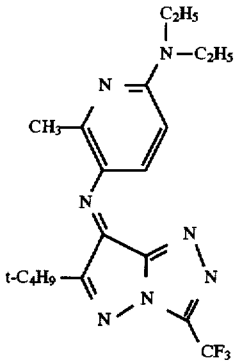

D-1

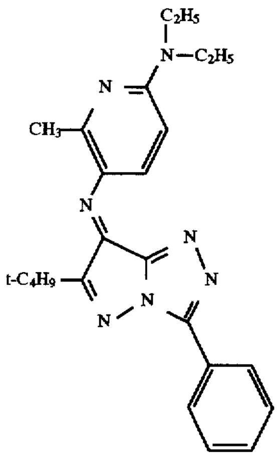

D-2

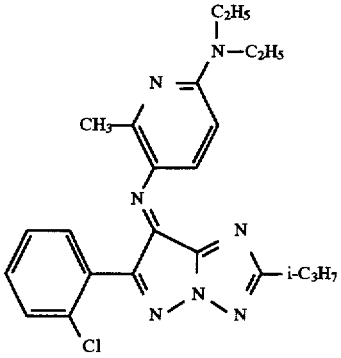

D-3

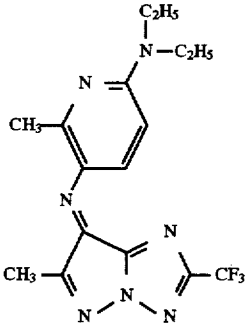

D-4

-continued
D-5
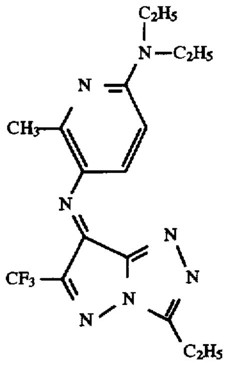
D-6
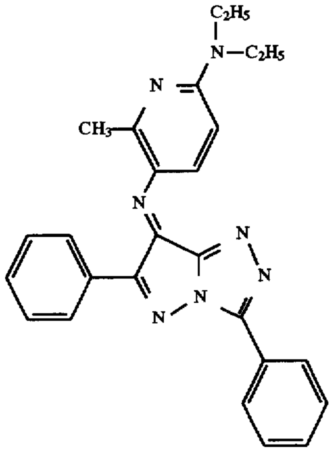
D-7
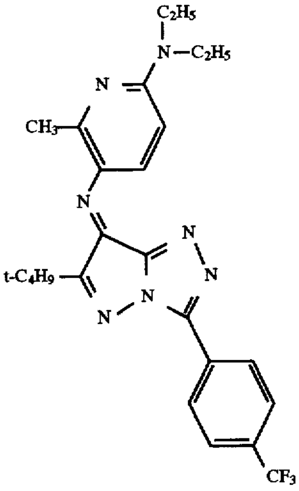
D-8
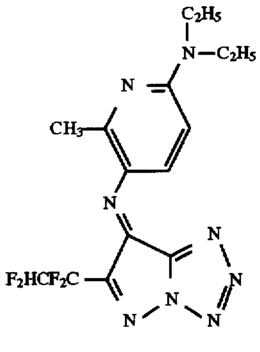
-continued
D-9
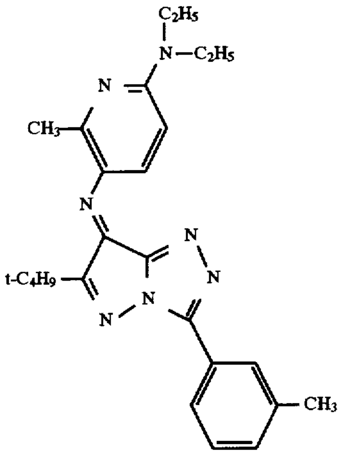
D-10
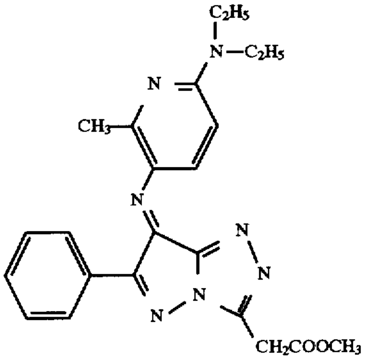
D-11
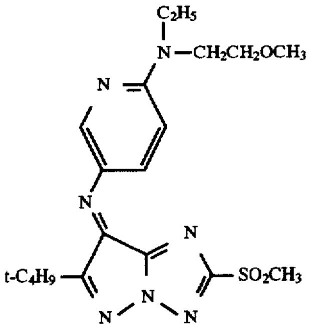
D-12
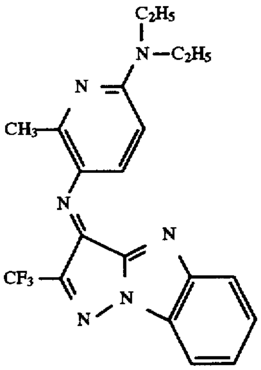

-continued
D-13
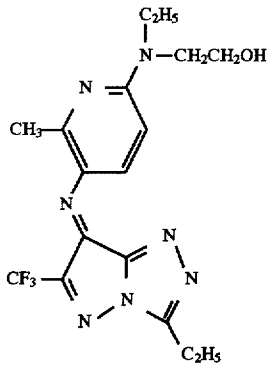
D-14
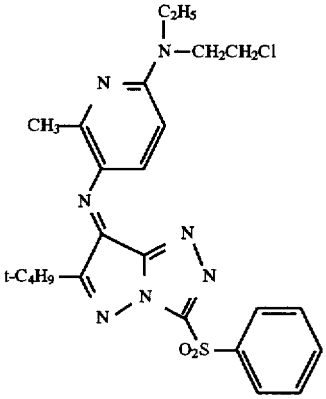
D-15
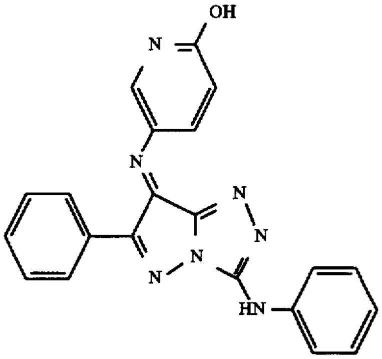
D-16
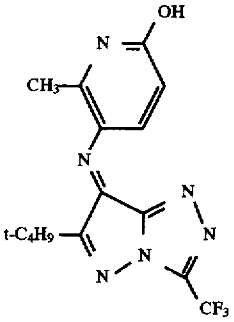
-continued
D-17
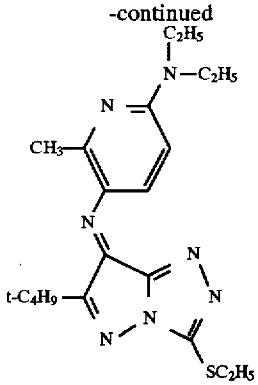
D-18
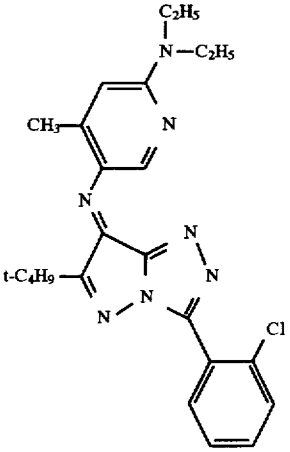
D-19
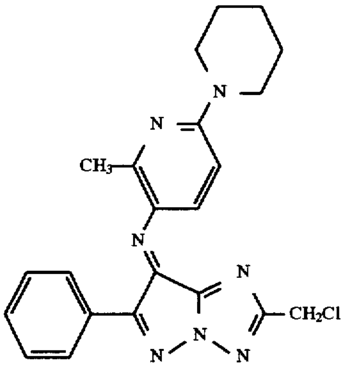
D-20
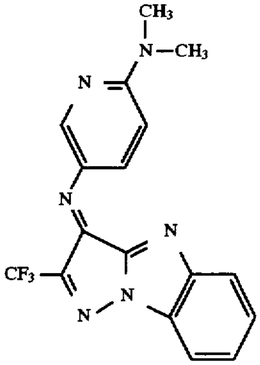

-continued
D-21
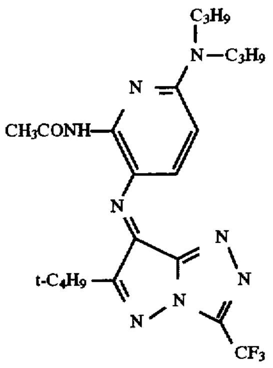
D-22
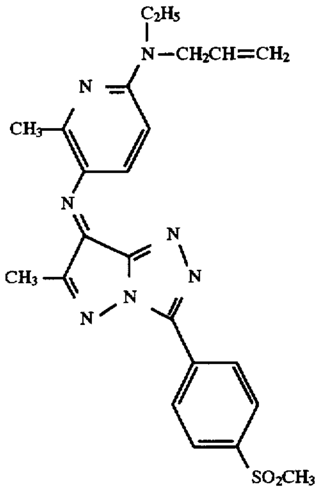
D-23
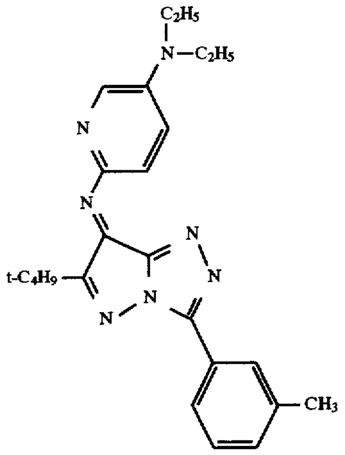
-continued
D-24
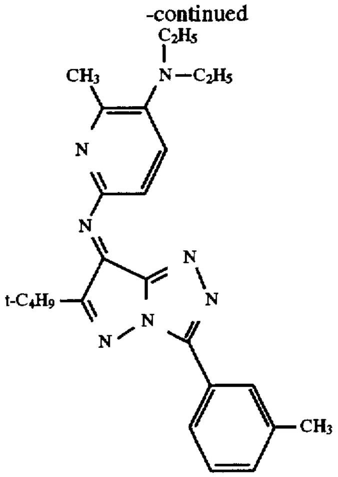
D-25
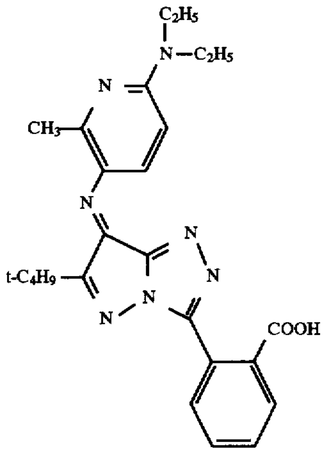
D-26
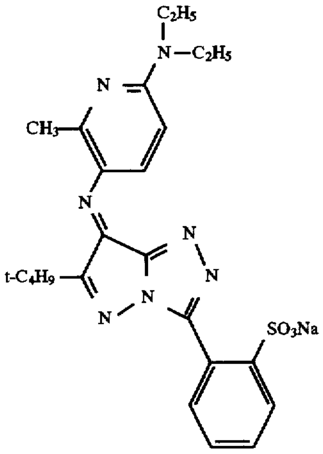

-continued
D-27
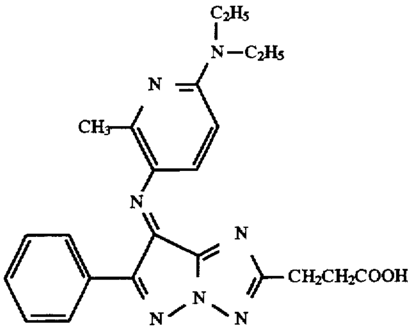
D-28
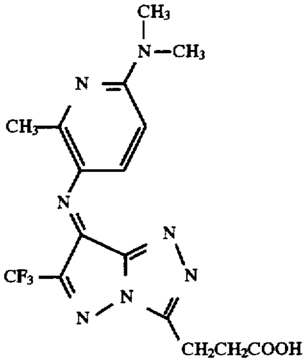
D-29
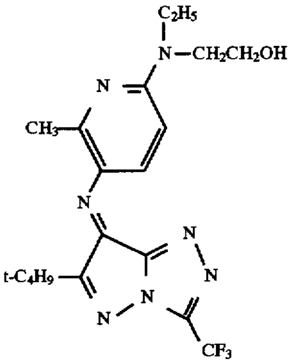
D-30
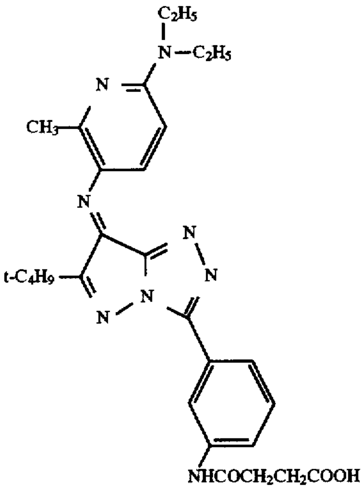
-continued
D-31
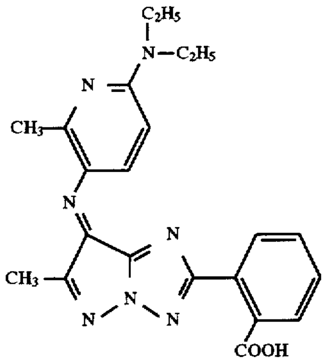
D-32
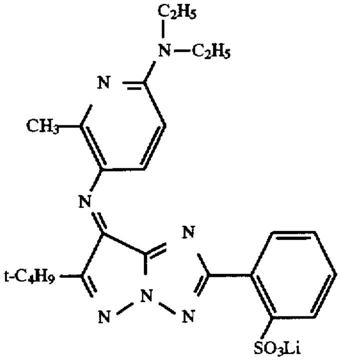
D-33
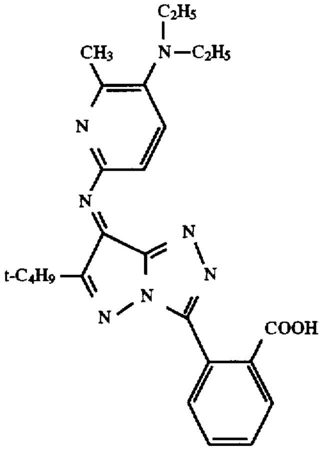
D-34
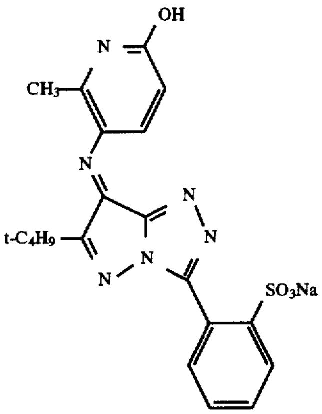

-continued
D-35
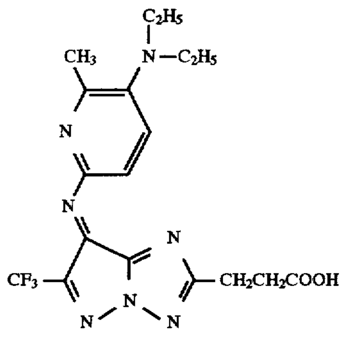
D-36
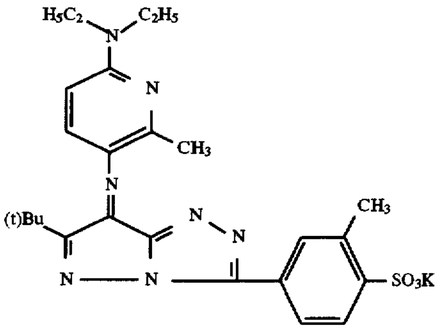
D-37
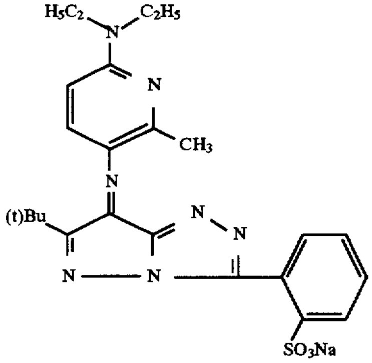
D-38
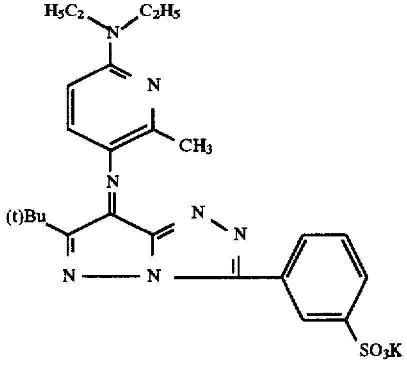
-continued
D-39
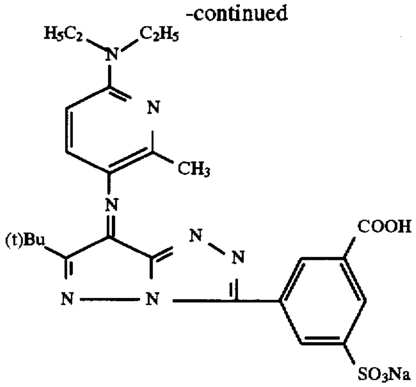
D-40
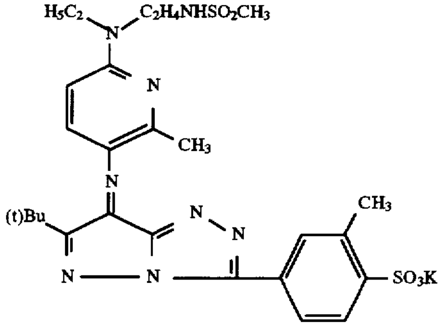
D-41
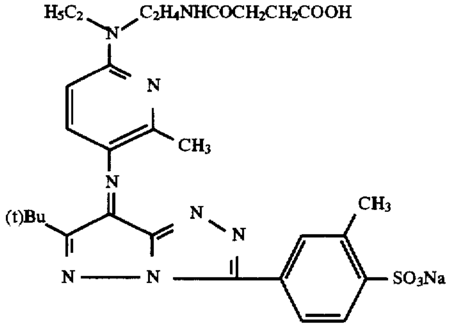
Of the dyes represented by Formula (1) is preferable an azomethine dye represented by the following Formula (I):
Formula (I)
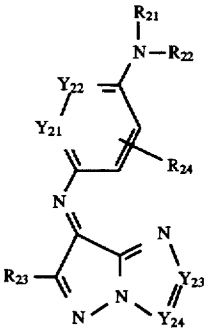
In Formula (I), $R_{21}$ represents a hydrogen atom, an alkyl group, an alkenyl group, an alkinyl group or an aralkyl group, $R_{22}$ represents a hydrogen atom, an alkyl group, an alkenyl group, an alkinyl group, an aralkyl group, an aromatic group or a heterocyclic group, provided that $R_{21}$ and $R_{22}$ may combine with each other to form a ring; $R_{23}$ represents an alkyl group having a Hammett σp value of −0.3 to 0.5; $R_{24}$ represents a hydrogen atom, an alkyl group, an alkoxy group, a halogen atom, an acylamino group, a ureido group, an alkoxycarbonyl group or a sulfonylamino group; one of $Y_{21}$ and $Y_{22}$ represents CR in which R represents a hydrogen atom, an alkyl group, an alkoxy group, a halogen atom, an acylamino group, a ureido group, an alkoxycarbonyl group or a sulfonylamino group and the other is nitrogen; and one of $Y_{23}$ and $Y_{24}$ represents CR' in which R' represents an alkyl group, an alkenyl group, an alkinyl group or an aralkyl group and the other is nitrogen, provided that at least one of $R_{21}$, $R_{22}$, $R_{23}$, $R_{24}$, R and R' has a sulfonic acid group, a carboxyl group or a salt thereof as a substituent.

2. an ink jet recording ink containing the azomethine dye represented by Formula (I) in an amount of 0.1 to 20.0% by weight, water in an amount of 1.0 to 98.9% by weight and a water soluble organic solvent in an amount of 1.0 to 98.9% by weight.

The invention will be detailed below.

The compound represented by Formula (I) will be explained.

In Formula (I), $R_{21}$ represents an alkyl group (for example, methyl, ethyl, propyl, isopropyl, butyl, isobutyl, pentyl, neopentyl or hexyl), an alkenyl group (for example, allyl), an alkinyl group (for example, propargyl), an aralkyl group (for example, benzyl or phenetyl); $R_{22}$ represents a hydrogen atom, an alkyl group (for example, methyl, ethyl, propyl, isopropyl, butyl, isobutyl, pentyl, neopentyl or hexyl), an alkenyl group (for example, allyl), an alkinyl group (for example, propargyl), an aralkyl group (for example, benzyl or phenetyl), an aryl group (for example, phenyl or naphthyl) or a heterocyclic group (for example, pyridyl, pyradinyl, pyrimidinyl, thienyl, furyl, thiazolyl, oxazolyl, isooxazolyl, pyrrolyl, pyrazolyl, imidazolyl, tetrahydrofuryl, piperazinyl, piperidinyl, morpholinyl, benzothiazolyl, benzoxazolyl or benzimidazolyl). $R_{21}$ and $R_{22}$ may combine with each other to form a ring (for example, a piperidine, pyrrolidine, piperazine or morpholine ring).

$R_{21}$ and $R_{22}$ may have a substituent, and the substituent includes an aliphatic group (for example, an alkyl group having 1 to 20 carbon atoms), an aryl group (for example, phenyl or naphthyl), a heterocuclic group (for example, a 5- or 6-membered heterocyclic ring containing an atom selected from a nitrogen atom, an oxygen atom and a sulfur atom), an alkoxy group (for example, an alkoxy group having 1 to 20 carbon atoms), an aryloxy group (for example, phenoxy or naphthyloxy), an acylamino group (for example, an alkanoyloxy group having 1 to 20 carbon atoms or benzoyloxy), an acyl group (for example, an alkanoyl group having 1 to 20 carbon atoms or benzoyl), a carbamoyl group (for example, an unsubstituted carbamoyl group, an alkylcarbamoyl-group having 1 to 20 carbon atoms, a dialkylcarbamoyl group having 2 to 40 carbon atoms, a phenylcarbamoyl group or an N-alkyl-N-phenylcarbamoyl group having 7 to 26 carbon atoms), an alkoxycarbonyl group (for example, an alkoxycarbonyl group having 1 to 20 carbon atoms), a sulfonylamino group (for example, an alkanesulfonylamino group having 1 to 20 carbon atoms or a benzenesulfonylamino group), a sulfamoyl group (for example, an unsubstituted sulfamoyl group, an alkylsulfamoyl group having 1 to 20 carbon atoms, a dialkylsulfamoyl group having 2 to 40 carbon atoms, a phenylsulfamoyl group or an N-alkyl-N-phenylsulfamoyl group having 7 to 26 carbon atoms), a hydroxy group, a sulfonyl group (for example, an alkanesulfonyl group having 1 to 20 carbon atoms or a benzenesulfonyl.group), an alkylthio group (for example, an alkylthio group having 1 to 20 carbon atoms), an arylthio group (for example, phenylthio), a ureido group (for example, an unsubstituted ureido group, an alkylureido group having 1 to 20 carbon atoms, a dialkylureido group having 2 to 40 carbon atoms or a phenylureido group), a urethane group (for example, an alkoxycarbonylamino group having 1 to 20 carbon atoms), a cyano group, a sulfo group, a carboxyl group, a nitro group or an amino group (for example, an unsubstituted amino group, an alkylamino group having 1 to 20 carbon atoms, a dialkylamino group having 2 to 40 carbon atoms, an anilino group or an N-alkylanilino group having 7 to 26 carbon atoms).

$R_{21}$ and $R_{22}$ preferably independently represent an alkyl group or an aralkyl group, and most preferably independently represent an alkyl group.

$R_{23}$ represents an alkyl group having a Hammett σp value of −0.3 to 0.5. Such an alkyl group includes methyl, ethyl, propyl, isopropyl, cyclopropyl, butyl, isobutyl, tert-butyl, pentyl, neopentyl, cyclopentyl, tert-amyl, hexyl, cyclohexyl, heptyl, octyl, 2-ethylhexyl, tert-octyl, nonyl, a methyl group having a substituent including hydroxy, acyloxy, alkoxy, phenoxy, alkylthio, phenylthio, amino (for example, unsubstituted amino, monoalylamino or dialkylamino), acylamino, alkoxycarbonylamino, ureido or sulfonylamino, an ethyl, propyl, isopropyl, butyl, isobutyl, tert-butyl or pentyl group having a substituent including hydroxy, acyloxy, alkoxy, phenoxy, alkylthio, phenylthio, amino (for example, unsubstituted amino, monoalylamino or dialkylamino), acylamino, alkoxycarbonylamino, ureido, sulfonylamino, acyl, sulfonyl, cyano, carbamoyl, carboxyl, sulfo, sulfamoyl or halogen). $R_{23}$ preferably represents an unsubstituted or substituted alkyl group having 1 to 6 carbon atoms, and more preferably represents an unsubstituted alkyl group having 1 to 6 carbon atoms.

Description of "Kagaku no Ryoiki", extra editiion 122, 85–121 (1980), published by Nankoudo is referred to the Hammett σp value in the invention.

$R_{24}$ represents a hydrogen atom, an alkyl group (for example, methyl or ethyl), an alkoxy group (for example, methoxy or ethyoxy), a halogen atom (for example, fluorine, chlorine or bromine), an acylamino group (for example, acetylamino, trifluoroacetylamino or propanoylamino), a ureido group (for example, methylureido or ethylureido), an alkoxycarbonyl group (for example, ethoxycarbonylamino) or a sulfonylamino group (for example, methanesulfonylamino or trifluoromethanesulfonylamino). $R_{24}$ preferably represents a hydrogen atom, an alkyl group or an acylamino group.

One of $Y_{21}$ and $Y_{22}$ represents CR in which R represents a hydrogen atom, an alkyl group (for example, methyl or ethyl), an alkoxy group (for example, methoxy or ethoxy), a halogen atom (for example, fluorine, chlorine or bromine), an acylamino group (for example, acetylamino, trifluoroacetylamino or propanoylamino), a ureido group (for example, methylureido or ethylureido), an alkoxycarbonyl group (for example, ethoxycarbonylamino) or a sulfonylamino group (for example, methanesulfonylamino or trifluoromethanesulfonylamino), provided that at least one of $Y_{21}$ and $Y_{22}$ is a nitrogen atom. It is preferable that $Y_{21}$ represents a CR group and $Y_{22}$ is a nitrogen atom, in which R preferably represents a hydrogen atom, an alkyl group or an acyl group and more preferably represents an alkyl group.

One of $Y_{23}$ and $Y_{24}$ represents CR' in which R' represents an alkyl group (for example, methyl, ethyl, propyl, isopropyl, cyclopropyl, butyl, isobutyl, tert-butyl, pentyl, neopentyl, tert-amyl, cyclopentyl, hexyl, 2-butylhexyl, cyclohexyl, heptyl, octyl, 2-ethylhexyl, tert-octyl or nonyl), an alkenyl group (for example, vinyl or allyl), an alkinyl group (for example, acetylenyl or propargyl) or an aralkyl group (for example,benzyl or phenetyl), provided that at least one of Y and Z is a nitrogen atom. R' may have a substituent. The substituent includes those denoted above as the substituent of $R_{21}$ and $R_{22}$. It is preferable that $Y_{22}$ is a nitrogen atom and $Y_{23}$ represents a CR' group. R' preferably represents an alkyl group.

In the azomethine dyes above at least one of $R_{21}$, $R_{22}$, $R_{23}$, $R_{24}$, R and R' has a sulfonic acid group, a carboxyl group or a salt thereof as a substituent. It is preferable that at least one of $R_{21}$, $R_{22}$, and R' has a sulfonic acid group, a carboxyl group or a salt thereof as a substituent.

The examples of a compound represented by Formula (I) (hereinafter referred to also as the dye of the invention) are listed below, but are not limited thereto.

I-1

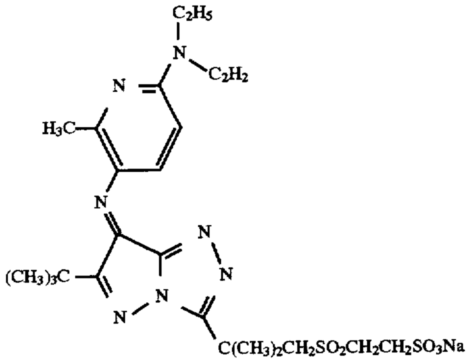

I-2

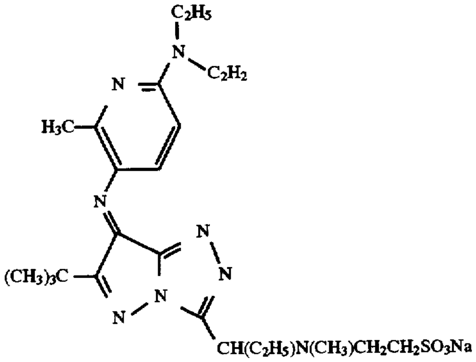

I-3

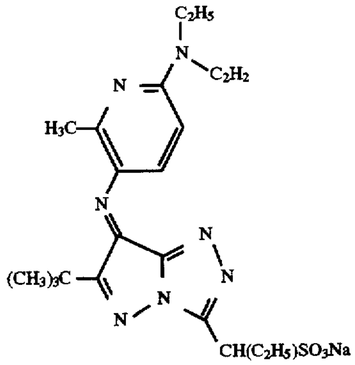

-continued

I-4

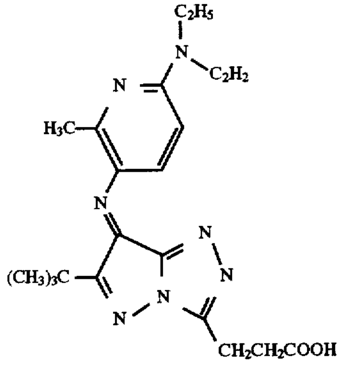

I-5

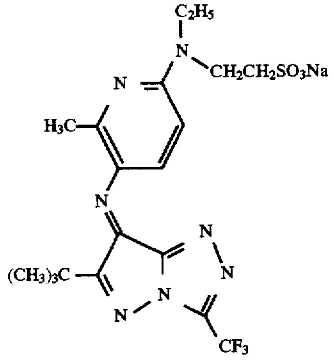

I-6

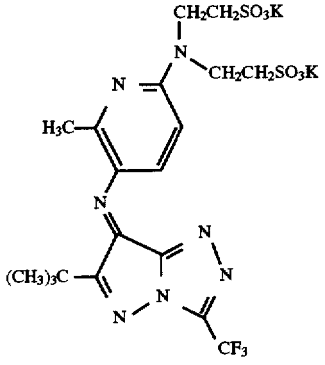

I-7

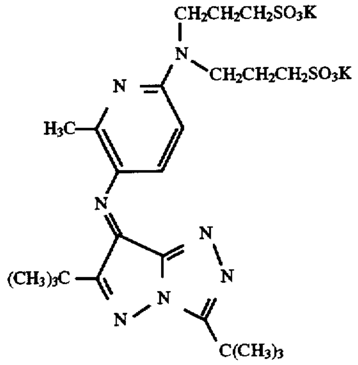

-continued
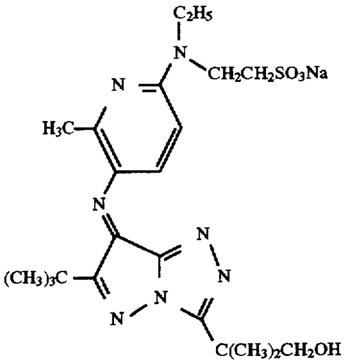
I-8
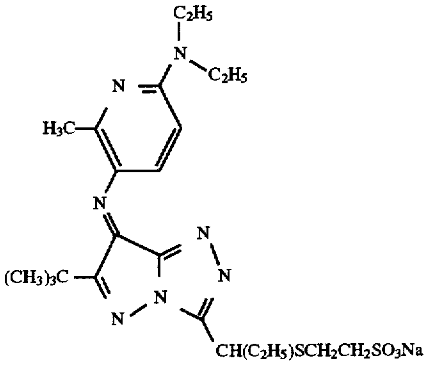
I-9
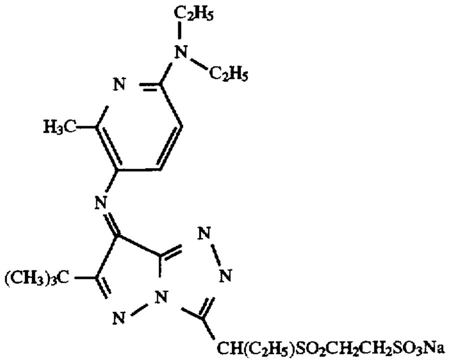
I-10
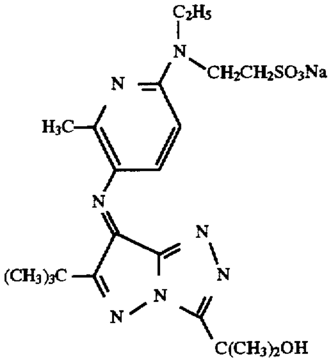
I-11
-continued
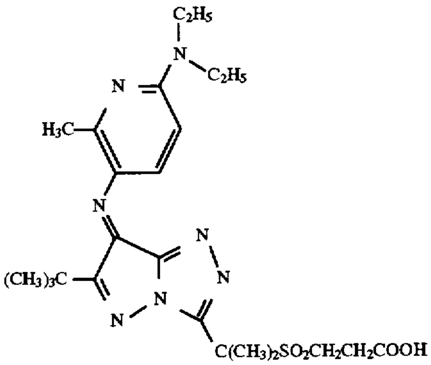
I-12
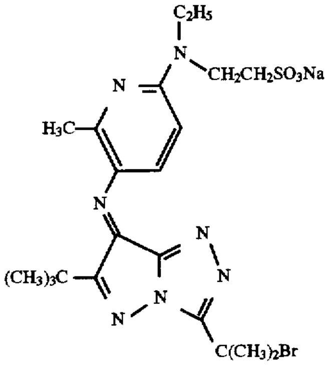
I-13
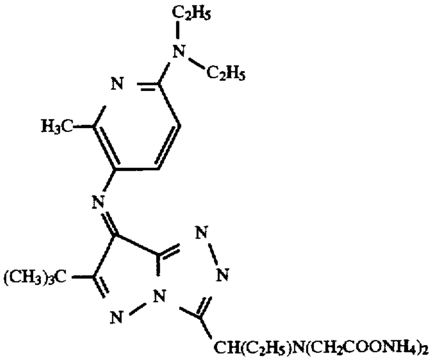
I-14
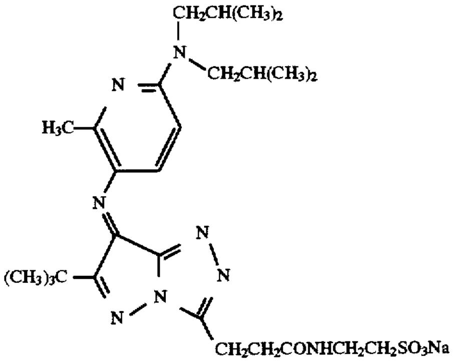
I-15

-continued
I-16
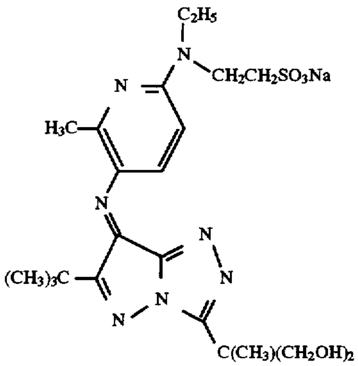
I-17
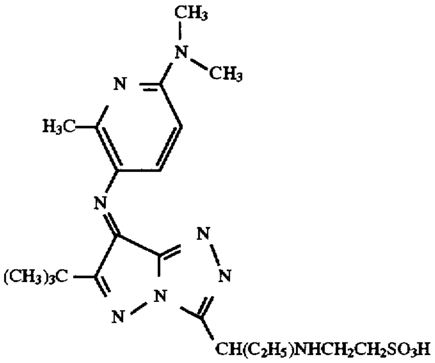
I-18
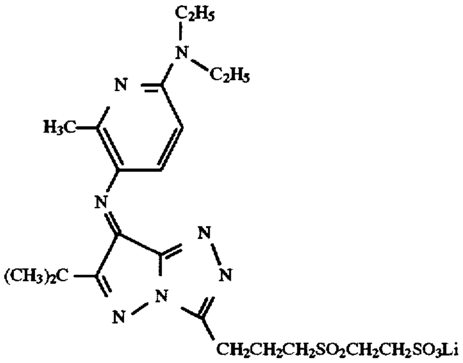
I-19
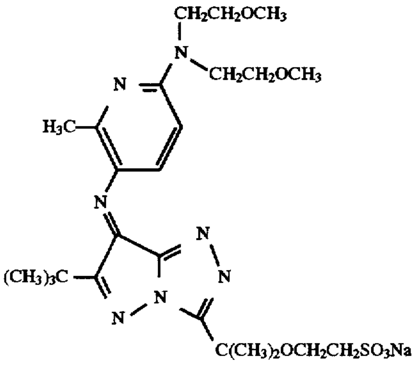
-continued
I-20
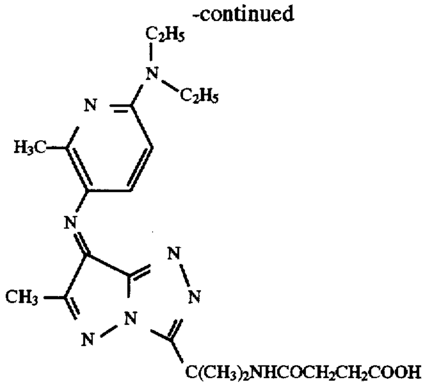
I-21
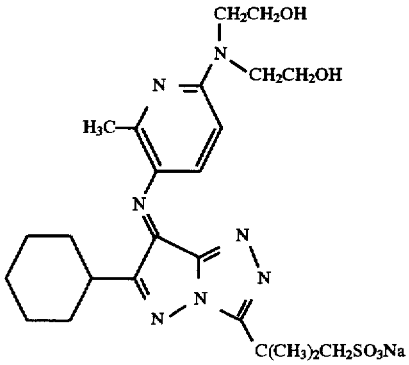
I-22
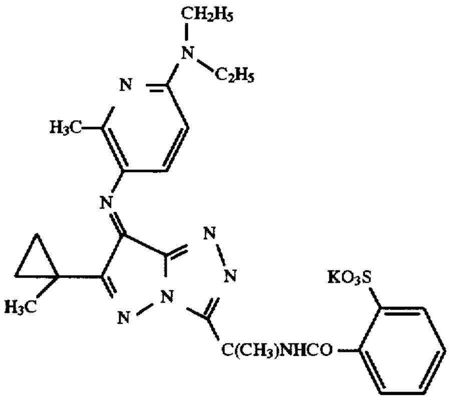
I-23
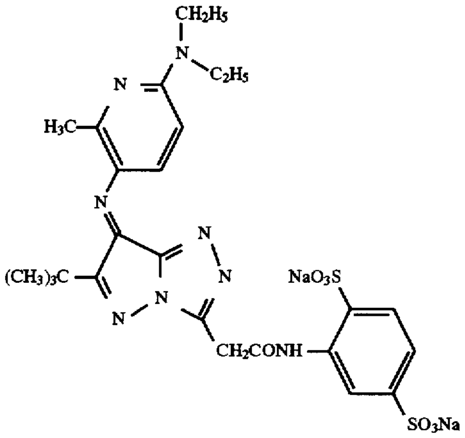

-continued
I-24
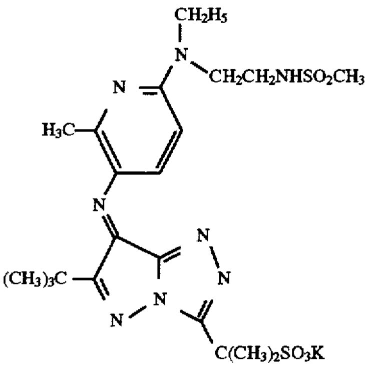
I-25
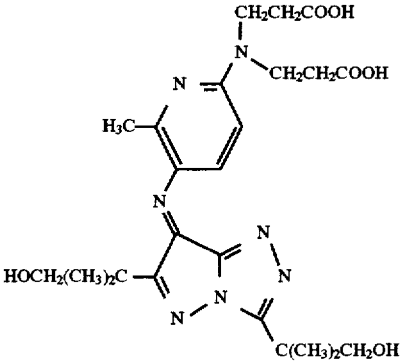
I-26
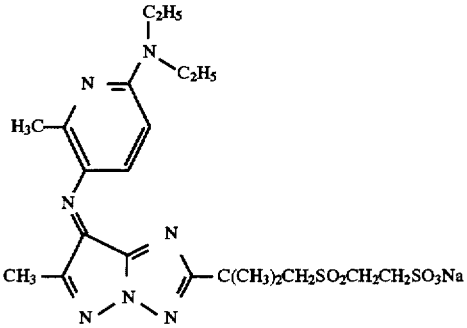
I-27
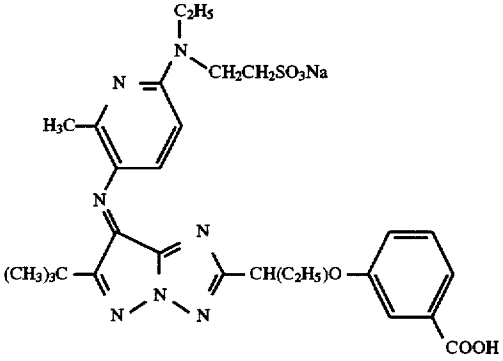
-continued
I-28
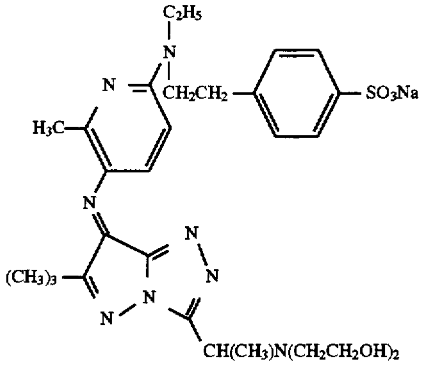
I-29
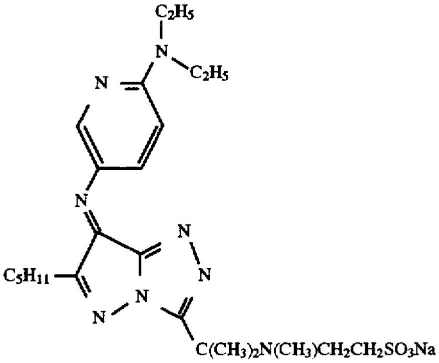
I-30
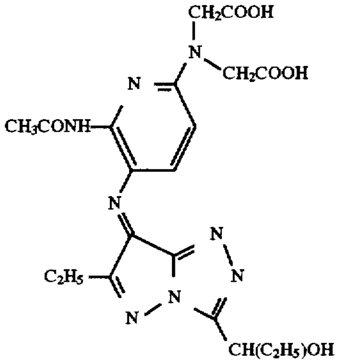
I-31
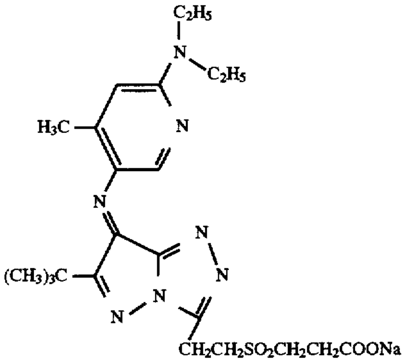

-continued
I-32
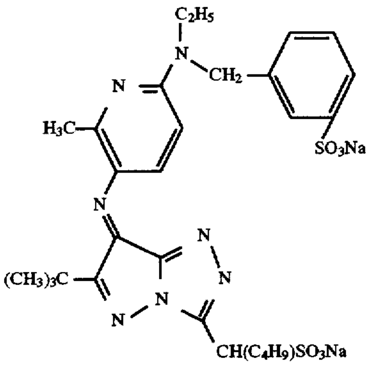
I-33
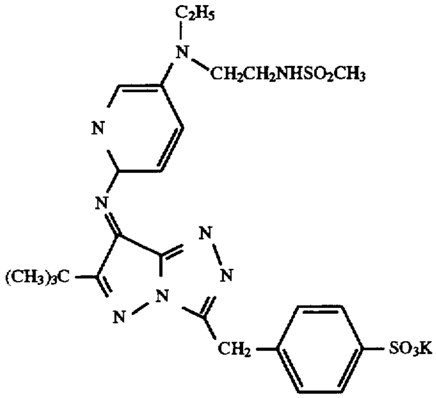
I-34
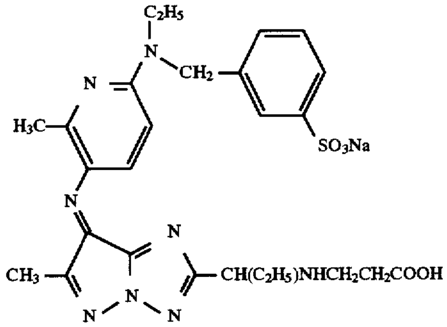
I-35
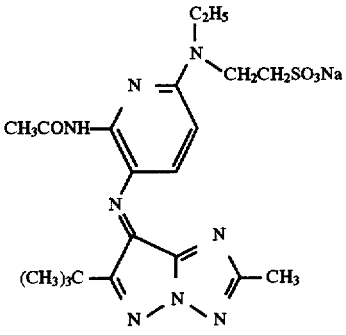
-continued
I-36
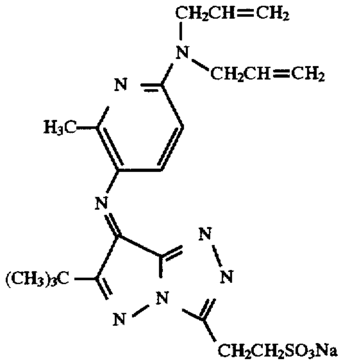
I-37
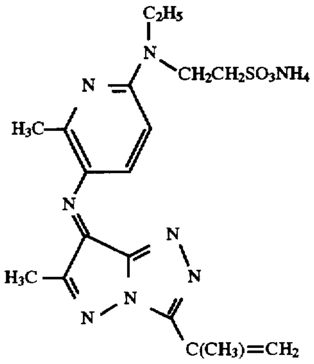
I-38
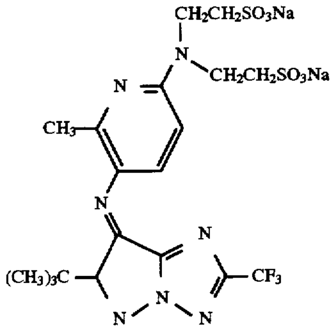
I-39
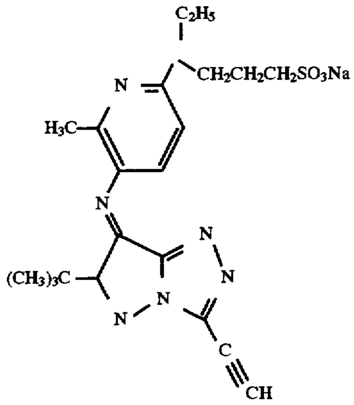

-continued
I-40
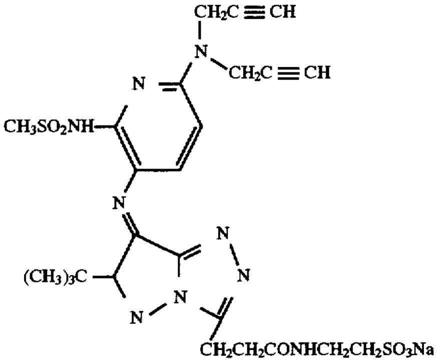
I-41
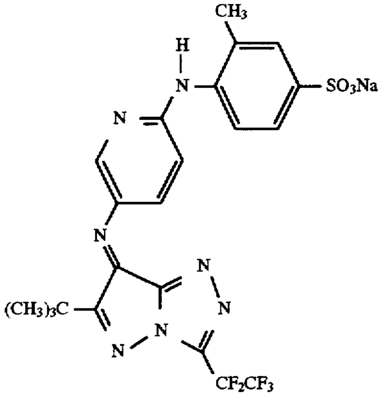
I-42
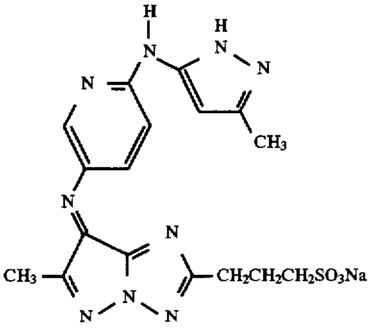
I-43
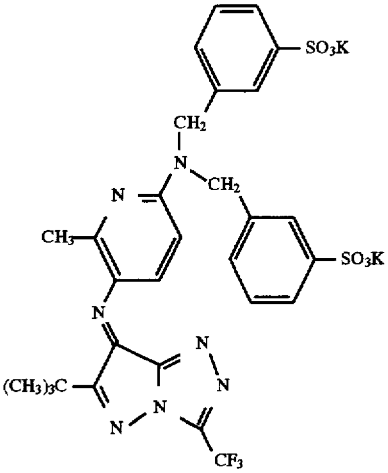
-continued
I-44
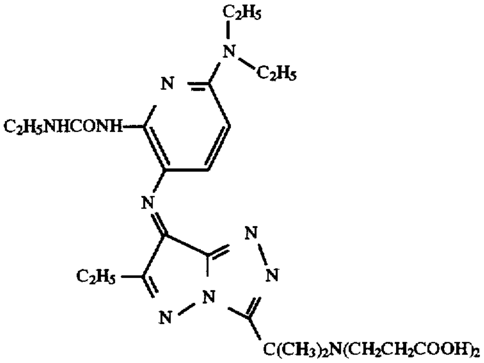
I-45
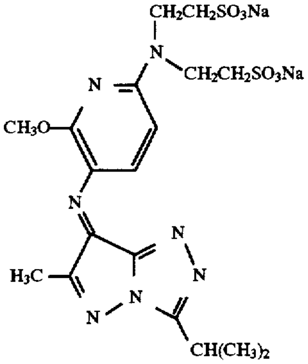
I-46
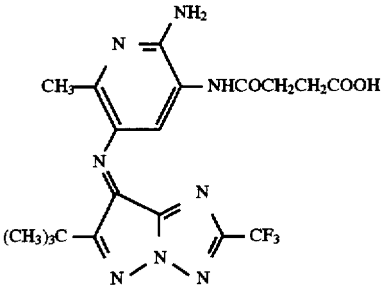
I-47
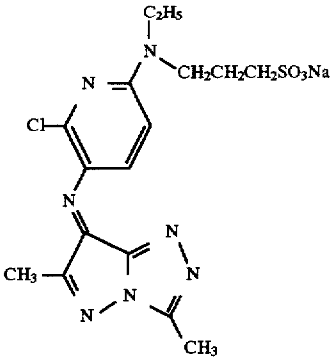

-continued
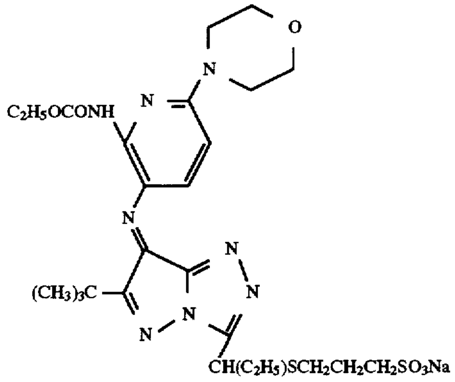
I-48
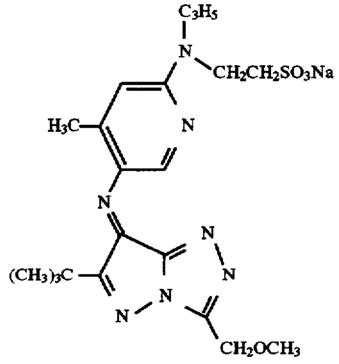
I-49
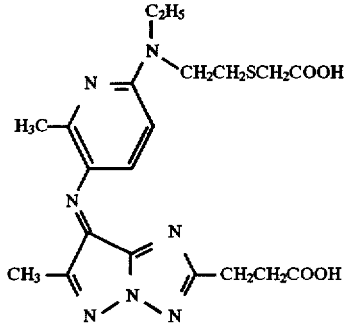
I-50
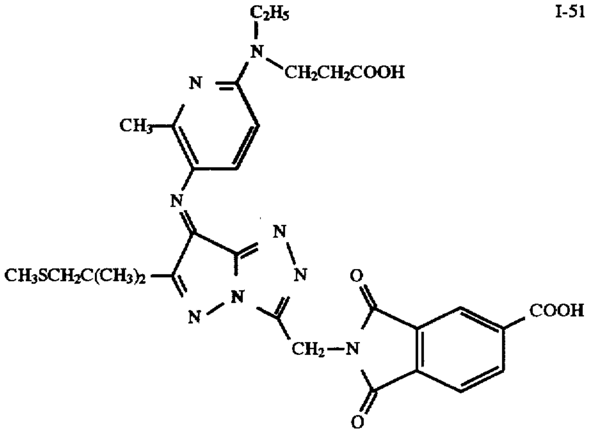
I-51
-continued
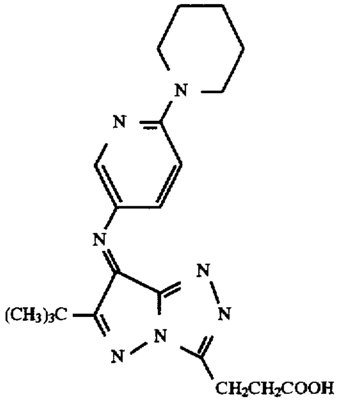
I-52
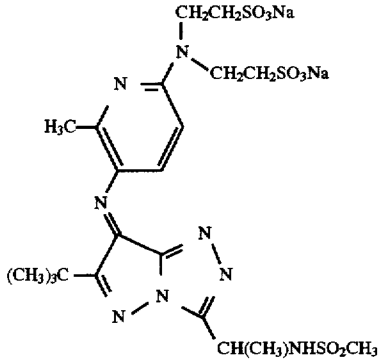
I-53
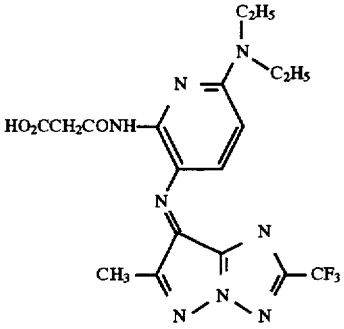
I-54
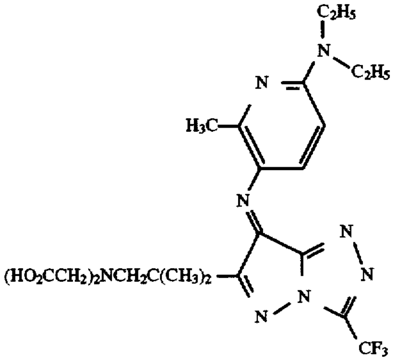
I-55

-continued

I-56

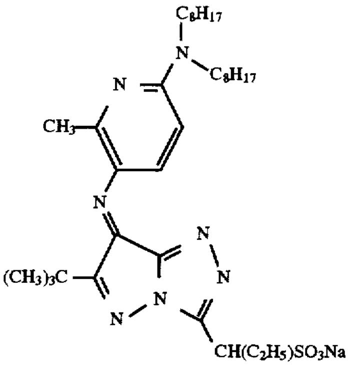

I-57

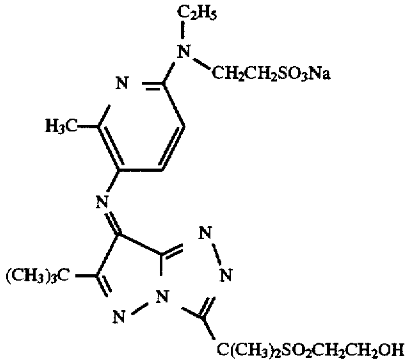

I-58

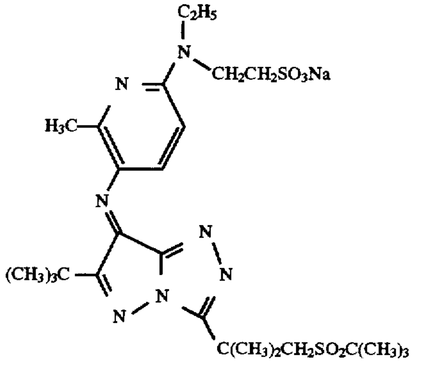

I-59

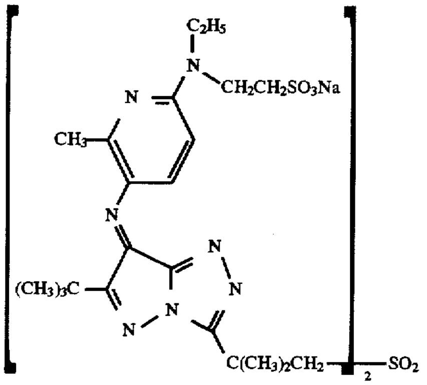

-continued

I-60

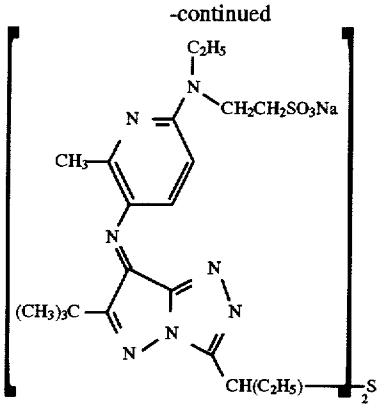

The above described dyes can be synthesized according to methods disclosed in Chem. Ber., 85, 1012 (1952), J. Am. Chem. Soc., 74, 3828 (1952), and Japanese Patent O.P.I. Publication Nos. 6-80638/1994 and 5-239367/1993.

As a solvent of the ink jet recording ink in the invention various kinds of solvents such as aqueous solvents, oil solvents and solid solvents (employing phase change) can be used. The aqueous solvents are preferable in the invention.

The aqueous solvent employs a mixture of water (preferably, ion-exchanged water) and a water soluble organic solvent.

The water soluble organic solvent includes alcohols (for example, methanol, ethanol, propanol, butanol, isobutanol, secondary butanol, tertiary butanol, pentanol, hexanol, cyclohexanol or benzylalcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), polyhydric alcohol ethers (for example, ethyleneglycol monomethylether, ethyleneglycol monoethylether, diethyleneglycol monomethylether, ethyleneglycol monobutylether, propyleneglycol monomethylether, propyleneglycol monobutylether, ethyleneglycol monomethylether acetate, triethyleneglycol monomethylether, triethyleneglycol monoethylether, ethyleneglycol monophenylether, propyleneglycol monophenylether), amines (for example, ethanol amine, diethanol amine, triethanol amine, N-methyldiethanol amine, N-ethyldiethanol amine, morpholine, N-ethylmorpholine, ethylenediamine, diethylenediamine, triethylenetetramine, tetraethylenepentamine, polyethyleneimine, pentamethyldiethylenetriamine, tetramethylpropylenediamine), amides (for example, formamide, N,N-dimethylformamide, N,N-dimethylacetoamide), heterocycric compounds (for example, 2-pyrrolidone, N-methyl-2-pyrrolidone, cyclohexylpyrrolidone, 2-oxazolidone, 1,3-dimethyl-2-imidazolidine), sulfoxides (for example, dimethylsulfoxide), sulfones (for example, sulfolane), urea, acetonitrile and acetone.

If the dye of the present invention is soluble in aforesaid solvent, the above-mentioned water-based solvent can be dissolved as it is to be used. On the other hand, if it is an insoluble solid, said dye may be dispersed in aforesaid solvent with a polymer dispersant or a surfactant after being reduced to fine particles using various dispersing machines (for example, a ball mill, a sand mill, an attriter, a roll mill, an agitator mill, a Henshell mixer, a colloid mill, a ultrasonic homogenizer, a pearl mill, a jet mill and an Ang mill) or dissolving said dye in a soluble organic solvent. In addition, when the dye is an insoluble liquid or semi-diffused material as it is, it may be dispersed in said solvent with a polymer dispersant or a surfactant as it is or after dissolving in a soluble organic solvent.

With regard to practical preparation method of water-based solvents used in the above-mentioned ink jet recording ink, see methods disclosed in Japanese Patent O.P.I. Publication Nos. 148436/1993, 295312/1993, 97541/1995, 82515/1995 and 118584/1995.

The oil solvent employs an organic solvent.

The oil solvent includes, in addition to the above described organic solvents, alcohols (for example, pentanol, heptanol, octanol, phenylethyl alcohol, phenylpropyl alcohol, furfuryl alcohol, anilalcohol), esters (for example, ethylene glycoldiacetate, ethylene glycol monomethyletheracetate, diethylene glycol monomethyletheracetate, propylene glycol diacetate, ethyl acetate, amyl acetate, benzyl acetate, phenylethyl acetate, phenoxyethyl acetate, ethyl phenylacetate, benzyl propionate, ethyl benzoate, butyl benzoate, butyl laurate, isopropyl mystyrate, triethyl phosphate, tributyl phosphate, diethyl phthalate, diethyl malonate, dipropyl malonate, diethyl diethylmalonate, diethyl succinate, dibutyl succinate, diethyl glutarate, diethyl adipate, dipropyl adipate, dibutyl adipate, di(2-methoxyethyl) adipate, diethyl sebacate, diethyl maleate, dibutyl maleate, dioctyl maleate, diethyl fumalate, dioctyl fumalate, 3-hexenyl cinnamate), ethers (for example, butyl phenyl ether, benzyl ethyl ether, hexyl ether), ketones (for example, benzyl methyl ketone, benzyl acetone, diacetone alcohol, cyclohexanone), hydrocarbons (for example, petroleum ether, petroleum benzine, tetralin, decalin, tertiary amyl benzene, dimethyl naphthalin), and amides (for example, N,N-diethyldodecanamide).

The dyes used in the invention can be dissolved in the above described oil solvent, or dissolved or dispersed in the above described oil solvent in admixture with a resin dispersing agent or binder.

The above oil solvent used in the ink jet recording ink can be adjusted according to methods disclosed in Japanese Patent O.P.I. Publication No. 3-231975/1991 and International Patent Publication No. 5-508883/1993.

The solvent used in the invention may be solid at ordinary temperature, which is capable of changing its phase to be in a liquid form when the ink jet ink is heat jetted during recording.

The phase changing solvent includes natural wax (for example, bees wax, carnauva wax, rice wax, Japan wax, hohoba-oil, spermaceti, candelilla wax, lanolin, montan wax, ozocerite, ceresine, paraffin wax, microcrystalline wax, petrolactam), polyethylene wax derivatives, halogenated hydrocarbons, organic acids (for example, palmitic acid, stearic acid, behenic acid, tiglic acid, 2-acetonaphthobehenic acid, 12-hydroxystearic acid, dihydroxystearic acid), esters of organic acids (for example, esters of the above organic acids with alcohols such as grycerin, diethylene glycol and ethylene glycol), alcohols (for example, dodecanol, tetradecanol, hexadecanol, eicosanol, docosanol, tetracosanol, hexacosanol, opctacosanol, dodecenol, myricyl alcohol, tetradecenol, hexadecenol, eicosenol, docosenol, pinene glycol, hinokiol, butyne diol, nonane diol, isophthalyl alcohol, mesicerin, terephthalyl alcohol, hexane diol, decane diol, dodecane diol, tetradecane diol, hexzdecane diol, docosane diol, tetracosane diol, terpineol, phenyl glycerin, eicosane diol, octane diol, phenyl propylene glycol, bisphenol A, p-α-cumylphenol), ketones (for example, benzoylacetone, diacetobenzene, benzophenone, tricosanone, heptacosanone, heptatriacontanone, hentriacontanone, laurone, dianisole), amides (for example, oleic amide, lauric amide, stearic amide, licinolic amide, palmitic amide, tetrahydrofuryl amide, erucic amide, myristic amide, 12-hydroxystearic amide, N-stearylerucic amide, N-oleylstearic amide, N,N'-ethylenebislauric amide, N,N'-ethylenebisstearic amide, N,N'-ethylenebisoleic amide, N,N'-methylenebisstearic amide, N,N'-ethylenebisbehenic amide, N,N'-xylylenebisstearic amide, N,N'-butylenebisstearic amide, N,N'-dioleyladipic amide, N,N'-distearyladipic amide, N,N'-dioleylsebacic amide, N,N'-distearylsebacic amide, N,N'-distearylterephthalic amide, N,N'-distearylisophthalic amide, phenacetin, toluamide, acetoamide, a reaction product of dimeric acid, diamine and fatty acid) such as an oleic acid dimer/ethylenediamine/stearic acid (1:2:2, molratio) reaction product), sulfonamides (for example, p-toluene sulfonamide, ethylbenzene sulfonamide, butylbenzene sulfonamide), silicones (for example, Silicone SH6018 produced by Toray Silicone Co., Ltd., Silicone KR215, 216, 220 produced by Shinetsu Silicone Co., Ltd.), cumarones (for example, Eskron G-90 produced by Shinnittetsu Kagaku Co., Ltd.), cholesterol fatty acid ester (for example, stearic acid cholesterol ester, palmitic acid cholesterol ester, myristic acid cholesterol ester, behenic acid cholesterol ester, lauric acid cholesterol ester, melissic acid cholesterol ester), and saccharide fatty acid esters (for example, stearic acid saccharose ester, palmitic acid saccharose ester, behenic acid saccharose ester, melissic acid saccharose ester, stearic acid lactose ester, melissic acid lactose ester, behenic acid lactose ester, lauric acid lactose ester, melissic acid lactose ester).

Phase change temperature of a solid (phase change) solvent in solid/liquid phase change is preferably 60°–200° C., and more preferably 80°–150° C.

The above-mentioned solid (phase change) solvent may be used after dissolving the dye of the present invention in a heated and fused solvent, and it may also be used after dispersing or dissolving in a resin-type dispersant or a binder.

With regard to a practical preparation method of aforesaid phase change solvent, see methods disclose in Japanese Patent O.P.I. Publication Nos. 186723/1993 and 70490/1995.

The viscosity of the ink jet recording ink of the present invention, wherein a water-based solvent, an oil-based solvent or a solid (phase change) solvent is used and the dye of the present invention is dissolved, when ejected, is preferably 40 cps or less, more preferably 30 cps or less, and still more preferably 0.5 to 10 cps.

The surface tension of the above-mentioned ink jet recording ink of the present invention during ejection is preferably 20–100 dyn/cm, and more preferably 30–80 dyn/cm.

The dye content in the ink jet recording ink of the invention is preferably 0.1–25 wt %, more preferably 0.1–20 wt % and still more preferably 0.5–10 wt %.

The ink jet recording ink of the invention preferably contains the dye of the invention in an amount of 0.1 to 20.0% by weight, water in an amount of 1.0 to 98.9% by weight and a water soluble organic solvent in an amount of 1.0 to 98.9% by weight.

As a resin type dispersant used in the present invention, polymers having molecular weight of 1,000–1,000,000 are preferable. When these are used, it is preferable to be contained in the ink jet recording ink at 0.1–50 wt %.

To the ink jet recording ink of the present invention, depending upon the purposes of improving various performances such as ejectting stability, compatibility to a print head or ink cartridge, storage stability and image stability, a viscosity regulator, a surface tension regulator, a specific resistance regulator, a layer former, a dispersant, a surfactant, a UV absorber, an anti-oxidant, an anti-color fading agent, an anti-mildew agent and an anti-rust agent may be added.

The ink jet recording ink in the invention is ejected on an ink receiving material such as paper using an ink jet printer.

There is no specific limit to ink jet recording systems regarding the ink jet recording ink in the present invention. However, it can be used specifically preferably as an ink jet recording ink for an on-demand type ink jet printer. As the on-demon-demand type, electro-mechanical conversion types (for example, a single cavity type, a double cavity type, a vendor type, a piston type, a shear mode type and a sheared-wall type), an electric-heat conversion type (for example, a thermal ink jet type and a bubble jet type), an electrostatic absorption type (for example, an electric field control type and a slit jet type) and discharge systems (for example, a spark jet type) can be cited as practical.

EXAMPLE

Hereinafter, the present invention will be explained in detail referring to examples. However, the embodiment of the present invention is not limited thereto.

Synthetic Example 1 (Synthesis of Exemplified Compound I-1)

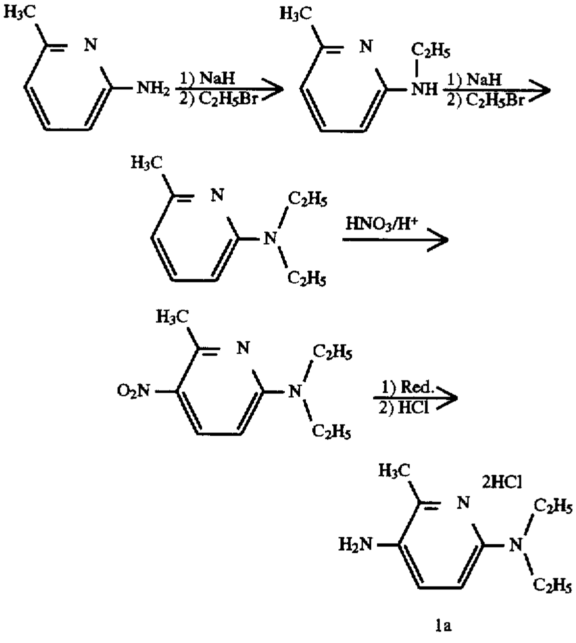

1a

-continued

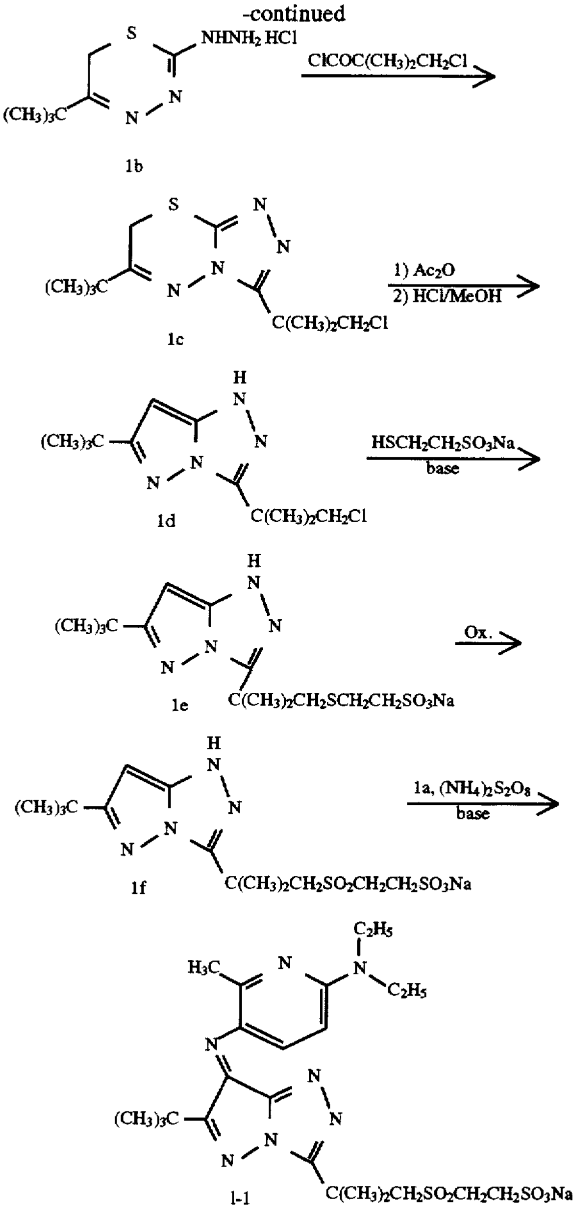

1b

1c

1d

1e

1f 1-1

(Intermediate 1a)

To a 3000 ml dry toluene were added 185 g of 60% sodium hydride. A solution of 500 g of 6-amino-2-picoline and 500 ml of toluene were dropwise added at 60° C. over about 2 hours to the resulting dispersion. Ethyl bromide of 554 g were dropwise added at 70° C. over about 2 hours to the resulting mixture and stirred for additional one hour. The reation mixture was added to 3000 ml of ice water. The organic phase was extracted and the extract was washed two times with water, concentrated and dried. Thus, 632 g of 6-ethylamino-2-picoline were obtained.

To a 3000 ml dry toluene were added 185 g of 60% sodium hydride. A solution of 632 g of 6-ethylamino-2-picoline and 500 ml of toluene was dropwise added at 90° C. over about 2 hours to the resulting dispersion and stirred at 93° C. for additional one hour. Ethyl bromide of 554 g were dropwise added at 90° C. over about 2 hours to the resulting mixture and stirred for additional one hour. The reation mixture was added to 3000 ml of ice water. The organic phase was extracted and the extract was washed two times with water, concentrated and dried. The product obtained above was evaporated under reduced pressure (7 mmHg). Thus, 630 g of 6-diethylamino-2-picoline ($bp_7$ 103–108) were obtained.

To a 1900 ml of concentrated sulfuric acid 630 g of 6-diethylamino-2-picoline were dropwise added while cooling with ice water. A 70% nitric acid solution of 347 g were dropwise added at not more than 5° C. over about 2 hours to the resulting mixture and stirred at 5° C. for additional one hour. The reation mixture was added to 4 kg of ice, neutralized with a sodium hydroxide solution, and extracted two times with ethyl acetate. The extract solution was washed two times with water, dried over anhydrous magnesium sulfate, concentrated and dried. Thus, 775 g of 6-diethylamino-3-nitro-2-picoline were obtained.

Forty gram of a 5% palladium/carbon catalyst were added to a solution of 675 g of 6-diethylamino-3-nitro-2-picoline and 4000 ml of methanol and subjected to hydrogen catalytic reduction in an autoclave. The resulting mixture was filtered to remove the catalyst, and the filtrate was added with 660 ml of concentrated hydrochloric acid. After removing the solvent, the residue was dispersed in 4000 ml of acetone, filtered out under reduced pressure and dried. Thus, 750 g of Intermediate 1a were obtained.

(Intermediate 1c)

Chloropivaloylchloride of 25.0 g were dropwise added to a solution of 32.6 g of Intermediate 1b and 300 ml of acetonitrile. The resulting mixture was refluxed for 20 minutes and the acetonitrile was removed by evaporation under redeuced pressure. The residue was mixed with 200 ml of toluene and 3.0 g of p-toluene sulfonic acid and refluxed for 2 hours while dehydrating with a Dean-Stark tube. The solvent of the resulting mixture was removed under reduced pressure and the residue was added with 500 ml of ethyl acetate and 300 ml of water. The organic solvent phase was washed with water, dried over anhydrous magnesium sulfate and the solvent was removed by evaporation. The residue was mixed with hexane. The resulting solid was obtained by filtering under reduced pressure and drying. Thus, 35.0 g of Intermediate 1c were obtained.

(Intermediate 1d)

A solution of 30.0 g of Intermediate 1c and 150 ml of acetic anhydride was refluxed for 12 hours. The acetic anhydride of the reaction mixture was evaporated under reduced pressure and the residue was mixed with 150 ml of methanol and 15 ml of concentrated hydrochloric acid, and refluxed for 2 hours. The reaction mixture was filtered while heating, and the filtrate was evaporated under reduced pressure to dryness. The resulting product was dispersed in acetonitrile and water, and filterewd to obtain Intermediate 1d. Thus, 21.2 g of Intermediate 1d were obtained.

(Intermediate 1e)

To 40 ml of ethylene glycol, 5.0 g of Intermediate 1d, 3.6 g of sodium mercaptoethanesulfonate and 1.5 g of potassium hydroxide were added and reacted at 150° C. for 20 minutes. The resulting reaction mixture was mixed with 50 ml of ethyl acetate and allowed to stand. The upper phase of the mixture was decanted. This process was repeated three times. The lower phase of the mixture was added with isopropyl alcohol to produce an inorganic salt which was removed by filtration. The resulting filtrate was concentrated under reduced pressure. Thus, 4.2 g of Intermediate 1e were obtained.

(Coupler 1f)

Intermediate 1e of 3.8 g was stirred in 20 ml of acetic acid, mixed with a small amount of sodium tungstate, and 9 ml of a 34.5% hydrogen peroxide solution was dropwise added at 60° C. The resulting mixture was stirred for additional about 30 minutes to obtain a coupler 1f solution.

(Exemplified Compound I-1)

The coupler 1f solution was neutralized with a sodium hydroxide solution, added with 8.0 g of potassium carbonate and 2.6 g of Intermediate 1a, and an aqueous solution containing 5.0 g of peroxo ammonium sulfate was dropwise added. The resulting mixture was stirred for 20 minutes and the resulting solid was filtered out. The thus obtained solid was dissolved in a small amount of methanol, and mixed with excess diisopropyl ether to produce a precipitate. The resulting precipitate obtained by filtration was purified by column chromatography to obtain 4.7 g of Dye I-1. The visible or ultraviolet absorption spectra of a methanol solution of Exemplified Compound I-1 are shown in FIG. 1.

Synthetic Example 2 (Synthesis of Exemplified Compound I-2)

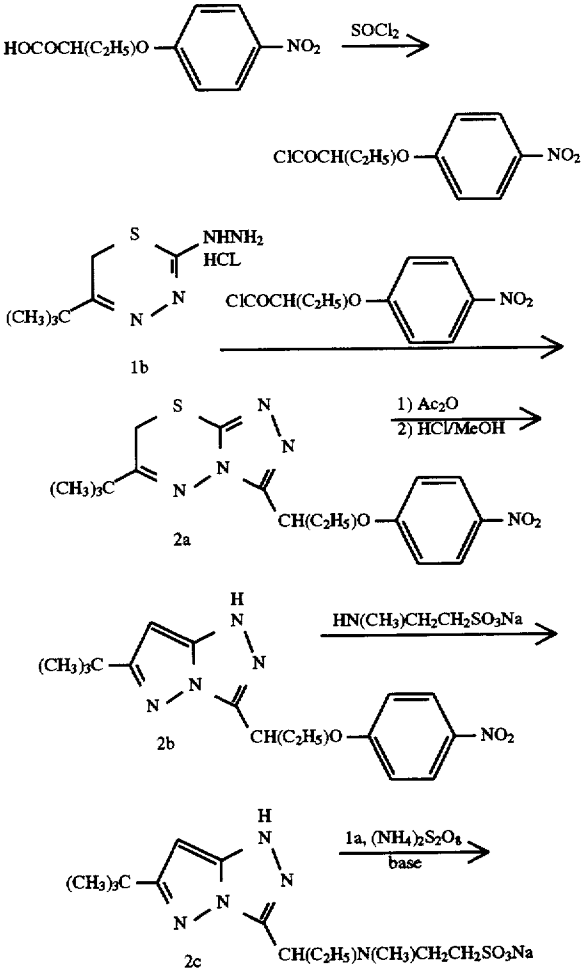

1b
2a
2b
2c

-continued

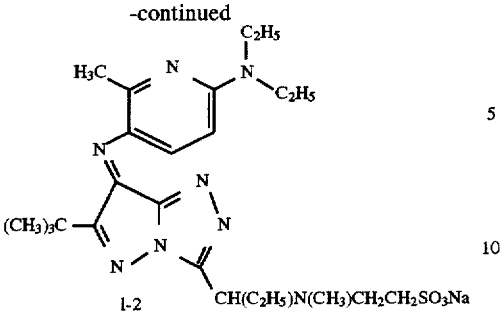

I-2

(Intermediate 2a)

A mixture solution of 20.0 g α-nitrophenoxybutyric acid, 100 ml chloroform and 20 ml thionyl chloride was refluxed for 3 hours. The resulting solution was distilled under reduced pressure to obtain an acid chloride. To 200 ml of acetonitrile were added 18.7 g of Intermediate 1b and the acid chloride obtained above was dropwise added while stirring. After the addition, the reaction mixture was refluxed for 2 hours, the solvent was evaporated under reduced pressure, and then 500 ml of ethyl acetate and 300 ml of water were added. The water phase was decanted. The organic solvent phase was washed with water, dried over anhydrous magnesium sulfate and the solvent was evaporated. The residue was crystallized in acetonitrile, and filtered to obtain a solid. Thus, 27.2 g of Intermediate 2a was obtained.

(Intermediate 2b)

A solution of 12.0 g of Intermediate 2a and 150 ml of acetic anhydride was refluxed for 3 hours. The acetic anhydride of the reaction mixture was evaporated under reduced pressure and the residue was mixed with 100 ml of methanol and 10 ml of concentrated hydrochloric acid, and refluxed for 2 hours. The reaction mixture was filtered while heating, and the filtrate was evaporated under reduced pressure to dryness. Then, 150 ml of ethyl acetate and 100 ml of water were added. The water phase was decanted. The organic solvent phase was washed with water, dried over anhydrous magnesium sulfate and the solvent was evaporated. The residue was crystallized in acetonitrile, and filtered to obtain a solid. Thus, 7.1 g of Intermediate 2b was obtained.

(Coupler 2c)

Intermediate 2b of 1.00 g was dissolved in 10 ml of dimethylformamide, and 0.88 g of an aqueous 65% N-methylurethane sodium salt solution were added and stirred at room temperature for one hour. Then, 30 ml of ethyl acetate and 30 ml of water were added. Thus, an aqueous Coupler 2c solution was obtained.

(Exemplified Compound I-2)

Figure 2:
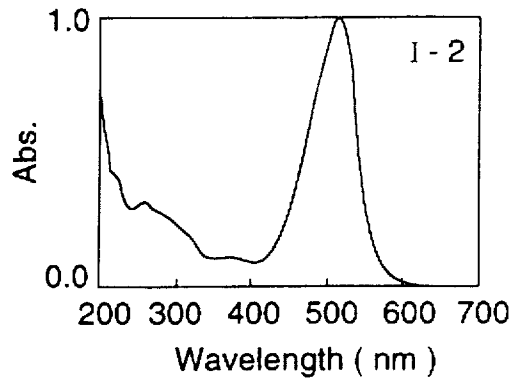
FIG. 2 shows visible and ultraviolet absorption spectra of an Exemplified Compound I-2 methanol solution.

To the above Coupler 2c solution were added 0.74 g of Intermediate 1a and 1.37 g of sodium carbonate, and 1.42 g of peroxo ammonium sulfate was gradually added. The resulting mixture was stirred at room temperature for 30 minutes, a saturated sodium chloride salt was added and the resulting crystals were filtered out. The thus obtained crude crystals were dissolved in methanol, mixed with diisopropyl ether of the same amount as the methanol, and stirred. The resulting solution was filtered to remove insoluble matter and the filtrate was concentrated to dryness. Thus, 1.12 g of Exemplified Compound I-2 were obtained. The visible or ultraviolet absorption spectra of a methanol solution of Exemplified Compound I-2 are shown in FIG. 2.

Synthetic Example 3 (Synthesis of Exemplified Compound I-3)

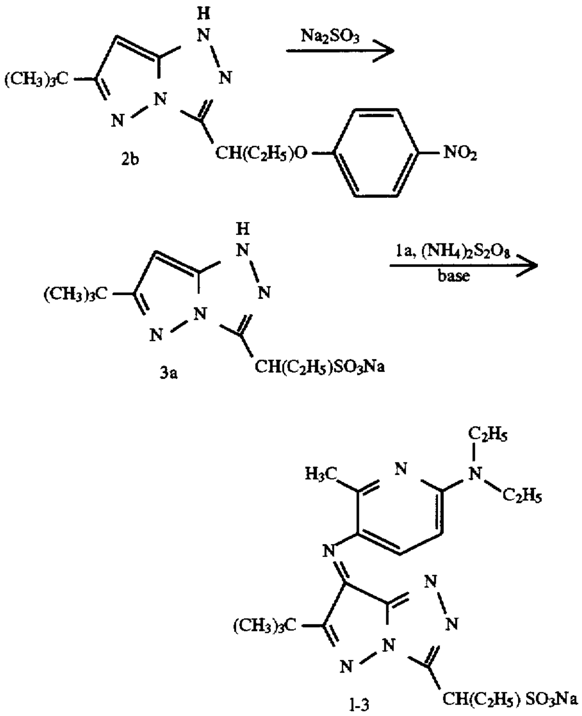

(Coupler 3a)

Intermediate 2b of 4.17 g was added to 100 ml of water and 25 ml of dimethylformamide, and 3.07 g of sodium sulfite were further added and refluxed for 10 minutes to obtain a Coupler 3b solution.

(Exemplified Compound I-3)

Figure 3:
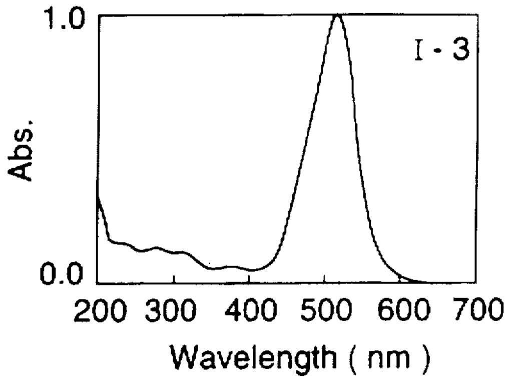
FIG. 3 shows visible and ultraviolet absorption spectra of an Exemplified Compound I-3 methanol solution.

To the above Coupler 3a solution were added at room temperature 5.90 g of peroxo ammonium sulfate. Then, 9.00 g of sodium carbonate were added and an aqueous solution containing 3.07 g of Intermediate 1a was dropwise added. The resulting solution was stirred for 20 minutes, and the resulting crystals were filtered out. The thus obtained crude crystals were dissolved in methanol, mixed with diisopropyl ether to produce crystals. The crystals were obtained by filtration and purified through a column chromatography. Thus, 3.81 g of Exemplified Compound I-3 were obtained. The visible or ultraviolet absorption spectra of a methanol solution of Exemplified Compound I-3 are shown in FIG. 3.

Synthetic Example 4 (Synthesis of Exemplified Compound I-4)

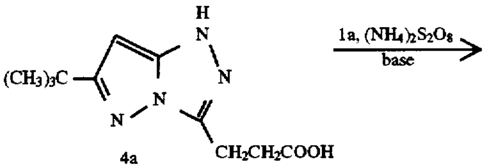

-continued

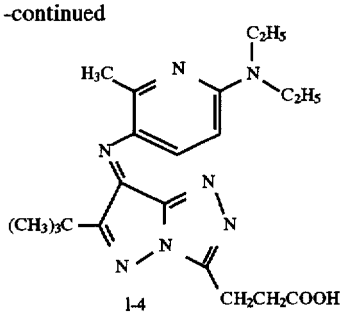

I-4

Figure 4:
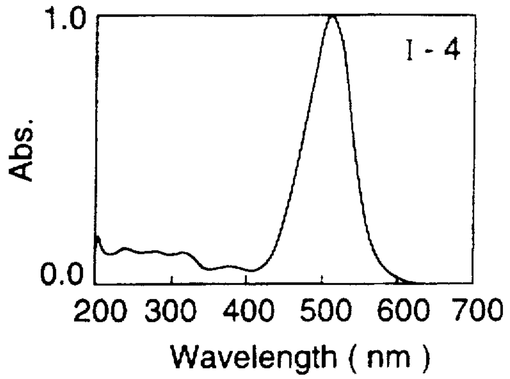
FIG. 4 shows visible and ultraviolet absorption spectra of an Exemplified Compound I-4 methanol solution.

To a mixture solution of 200 ml water and 50 ml methanol were added 4.80 g of Coupler 4a, 5.00 g of Intermediate 1a (Synthetic Example 1) and 7.00 g of sodium acetate, and 9.00 g of peroxo ammonium sulfate solution was gradually added. The resulting mixture was stirred at room temperature for one hour and acidified to pH 4 with concentrated hydrochloric acid to produce solid. The produced solid was obtained by filtration and added with 200 ml of water and alkalified to pH 9 with sodium hydroxide to dissolve the solid. The resulting solution was filtered. The filtrate was added with concentrated hydrochloric acid and adjusted to pH 4. The resulting solid was obtained by filtration and washed with water. Thus, 5.75 g of Exemplified Compound I-4 were obtained. The visible or ultraviolet absorption spectra of a methanol solution of Exemplified Compound I-4 are shown in FIG. 4.

Synthetic Example 5 (Synthesis of Exemplified Compound I-5)

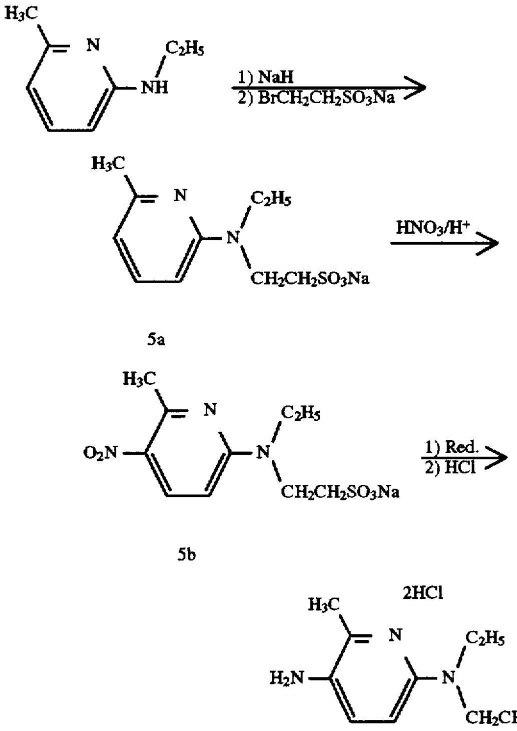

5a

5b

5c

-continued

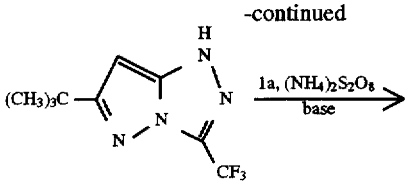

5d

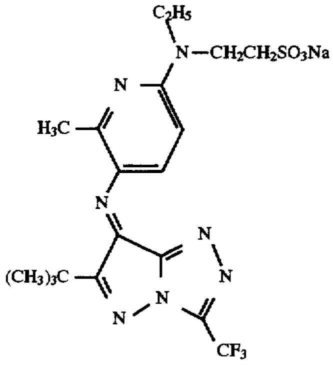

I-5

(Intermediate 5a)

To a 100 ml dry toluene were added 4.72 g of 60% sodium hydride. A solution of 16.07 g of 6-ethylamino-2-picoline (Synthetic Example 1) and 100 ml of toluene was dropwise added at 90° C. over about 1 hour to the resulting dispersion and stirred at 93° C. for additional one hour. Sodium 2-bromoethane sulfonate of 25.00 g were dropwise added to the resulting mixture solution and 10 ml of N,N-dimethylformamide was dropwise added at 100° C. over 30 minutes, and stirred for additional one hour. The reaction mixture was added to 200 ml of ice water. The water phase was extracted and the extract was mixed with 50 ml of a saturated sodium chloride solution and stirred to produce crystals. The crystals were obtained by filtration, dissolved in a small amount of methanol and further added with ethanol of the same amount as methanol. The resulting solution was filtered and the filtrate was mixed with excess diisopropyl ether to produce crystals. The produced crystals were obtained by filtration. Thus, 14.77 g of Intermediate 5a were obtained.

(Intermediate 5b)

To a 40 ml of concentrated sulfuric acid 12.00 g of Intermediate 5a were dropwise added while cooling with ice water. A 60% nitric acid solution of 4.77 g were dropwise added at not more than 5° C. over about 40 minutes to the resulting mixture and stirred at 5° C. for additional one hour. The reaction mixture was added to 200 ml of ice water, neutralized with a sodium hydroxide solution, and mixed with 200 ml of methanol and 100 ml of ethanol. The resulting mixture was filtered to remove precipitates of organic salts. The filtrate was concentrated under reduced pressure and the residue was dissolved in a mixture solution of 100 ml methanol and 50 ml ethanol and filtered. The resulting filtrate was concentrated to about 30 ml, mixed with 60 ml of diisopropylether and stirred for two hours while cooling. The resulting crystals were obtained by filtration. Thus, 12.43 g of Intermediate 5b were obtained.

(Intermediate 5c)

1.20 g of a 5% palladium/carbon catalyst were added to a solution of 11.00 g of Intermediate 5b and 100 ml of methanol and subjected to hydrogen catalytic reduction in an autoclave. The resulting mixture was filtered to remove the catalyst, and the filtrate was added with 10 ml of concentrated hydrochloric acid. After removing the solvent, the residue was dispersed in 200 ml of ethanol, filtered out under reduced pressure and dried. Thus, 11.4 g of Intermediate 5c were obtained.

(Exemplified Compound I-5)

Figure 5:
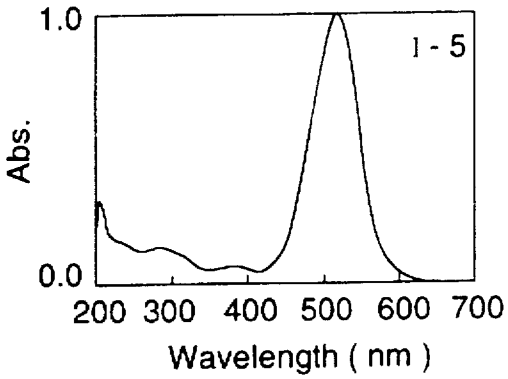
FIG. 5 shows visible and ultraviolet absorption spectra of an Exemplified Compound I-5 methanol solution.

To a mixture solution of 40 ml water and 30 ml methanol were added 1.16 g of Coupler 5d, 1.94 g of Intermediate 5c and 2.05 g of sodium acetate, and 2.50 g of peroxo ammonium sulfate solution was gradually added at room temperature. The resulting mixture was stirred for one hour, the methanol was evaporated under reduced pressure and mixed with 60 ml of water. The resulting solution was filtered to remove insoluble matter. The resulting filtrate was mixed with 10 ml of a saturated sodium chloride solution, and stirred to produce crystals. The crude crystals were dissolved in acetone and filtered to remove insoluble matter. The resulting filtrate was concentrated under reduced pressure to dryness. Thus, 1.12 g of Exemplified Compound I-5 were obtained. The visible or ultraviolet absorption spectra of a methanol solution of Exemplified Compound I-5 are shown in FIG. 5.

Synthetic Example 6 (Synthesis of Exemplified Compound I-8)

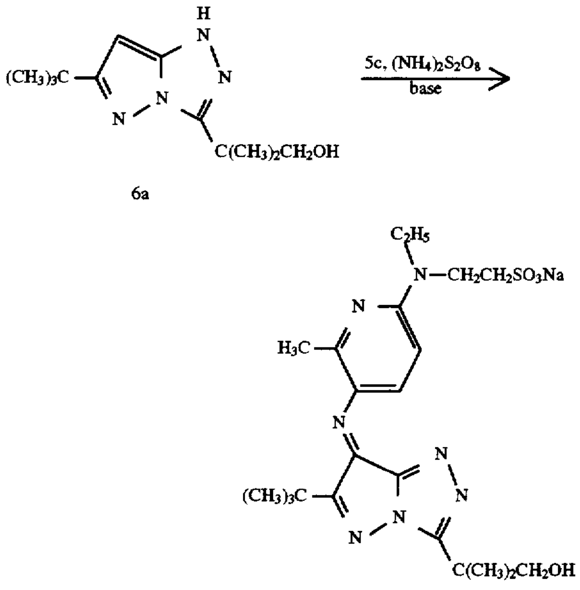

6a

I-8

Figure 6:
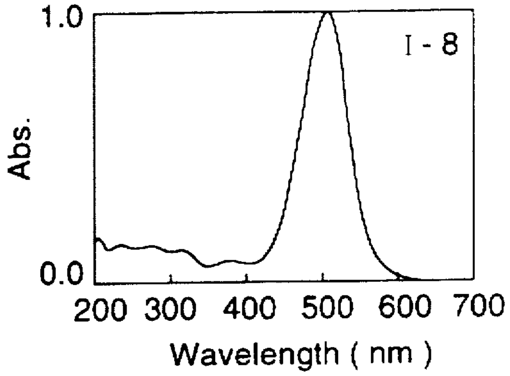
FIG. 6 shows visible and ultraviolet absorption spectra of an Exemplified Compound I-8 methanol solution.

To a mixture solution of 40 ml water and 30 ml methanol were added 1.18 g of Coupler 5a, 1.94 g of Intermediate 5c (Synthetic Example 5) and 2.05 g of sodium acetate, and 2.50 g of peroxo ammonium sulfate solution was gradually added at room temperature. The resulting mixture was stirred for one hour, the methanol was evaporated under reduced pressure and mixed with 60 ml of water. The resulting solution was filtered to remove insoluble matter. The resulting filtrate was mixed with 10 ml of a saturated sodium chloride solution, stirred and allowed to stand. The supernant was decanted and the precipitated oil was collected. The oil was dissolved in 30 ml of water, added with 10 ml of a saturated sodium chloride solution while cooled with ice water and stirred to produce crystals. The crude crystals were obtained by filtration. The crystals were dissolved in 20 ml of methanol, mixed with 100 ml of diisopropylether and filtered to remove insoluble matter. The resulting filtrate was concentrated, dispersed in diisopropylether while cooling and further filtered. Thus, 0.98 g of Exemplified Compound I-8 were obtained. The visible or ultraviolet absorption spectra of a methanol solution of Exemplified Compound I-8 are shown in FIG. 6.

Synthetic Example 7 (Synthesis of Exemplified Compound I-16)

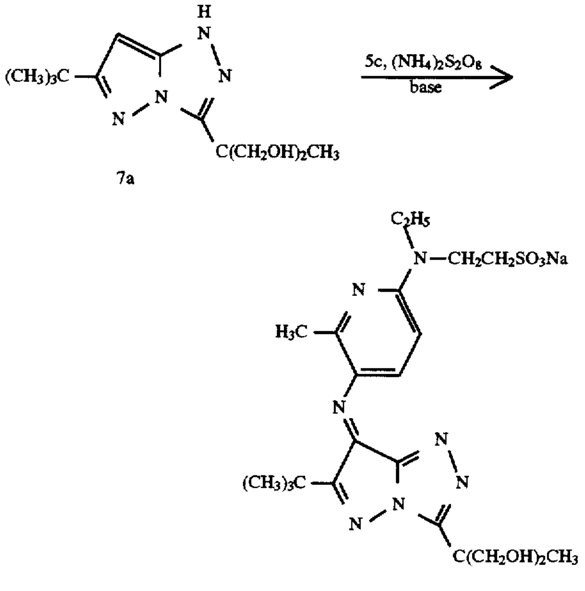

7a

I-16

Figure 7:
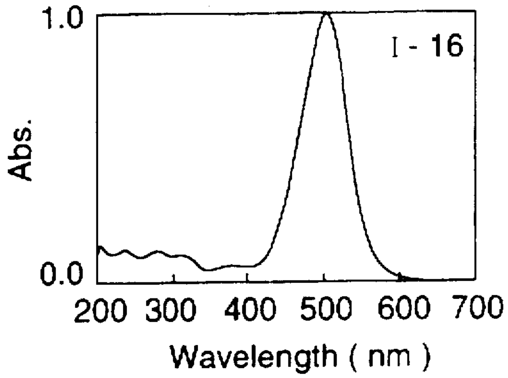
FIG. 7 shows visible and ultraviolet absorption spectra of an Exemplified Compound I-16 methanol solution.

To a mixture solution of 40 ml water and 30 ml methanol were added 1.62 g of Coupler 7a, 2.11 g of Intermediate 5c (Synthetic Example 5) and 2.87 g of sodium acetate, and 1.26 g of peroxo ammonium sulfate solution was gradually added at room temperature. The resulting mixture was stirred for one hour, the methanol was evaporated under reduced pressure and mixed with 60 ml of water. The resulting solution was filtered to remove insoluble matter. The resulting filtrate was mixed with 10 ml of a saturated sodium chloride solution, and stirred to produce crystals. The crude crystals were dissolved in acetone and filtered to remove insoluble matter. The resulting filtrate was concentrated under reduced pressure to dryness. Thus, 1.09 g of Exemplified Compound I-16 were obtained. The visible or ultraviolet absorption spectra of a methanol solution of Exemplified Compound I-16 are shown in FIG. 7.

In the FIGS. 1 through 7 above described, the ordinate shows absorbance (Abs.) and the abscissa shows wavelength (nm).

Example 1

Using each of ink components having compositions described in Tables 1, 2 and 3 and an ink jet printer MJ-5000C (produced by Seiko Epson, an electro-mechanical conversion type), a sample wherein an image was recorded on a super fine coated paper MJSP1 for ink jet (produced by Seiko Epson) was obtained.

In Table 3, copolymer A represents Acryloid DM-55 (produced by Rohm and Haas, an acrylic copolymer), and copolymer B represents Elvax 40-W (produced by Du Pont, an ethylene/vinyl acetic acid copolymer).

Tables 1, 2 and 3 show results of evaluation on light fastness, color tone and storage stability using aforesaid samples.

The component content of each ink composition in Tables 1, 2 and 3 is represented in terms of % by weight Light fastness:

After the recorded samples were exposed for 24 hours to an Xenon Fadometer, the reflection density at the visible maximum absorption wavelength was measured. The difference between before and after exposure was caluculated.

Light Fastness (%)=(Density at the maximum absorption wavelength after exposure)/(Density at the maximum absorption wavelength before exposure)×100

Color Tone:

The reflection spectra of the samples of interval 10 nm in the range of 490 to 730 nm was measured and a* and b* were calculated based on CIE. L*a*b* color space system. The preferable magenta color was defined as follows:

Preferable range of a*: 76 or more

Preferable range of b*: −30 to 0

○: Both a* and b* are within the preferable ranges.

Δ: Only one of a* and b* is within the preferable range.

X: Both a* and b* are outside the preferable range.

Storage Stability

The ink compositions prepared above were stored at 80° C. for one week in a sealed glass container. Recording was carried out employing the resulting ink compositions in the same manner as above, except that the ink compositions were continuously jetted for 500 hours. The jetting faults were examined and the color tone was evaluated as above. The preferable storage stability was defined as follows:

○: No jetting faults in continuing the ink recording was observed and the color tone change of both a* and b* are in the range of ±10.

X: Jetting faults in continuing the ink recording was observed and the color tone change of at least one of a* and b* are 10 or more.

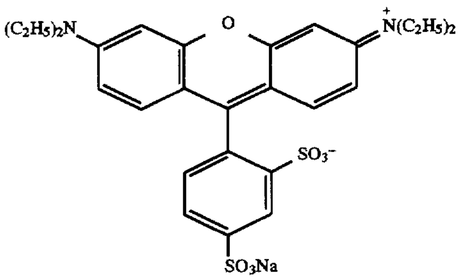

R-1

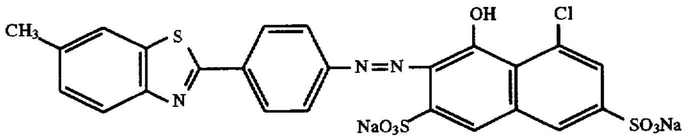

R-2

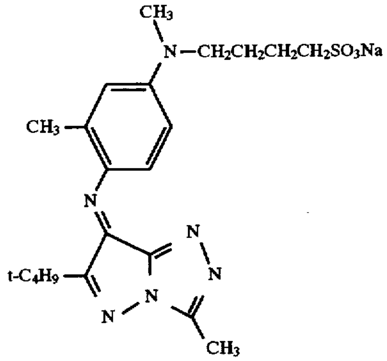

R-3

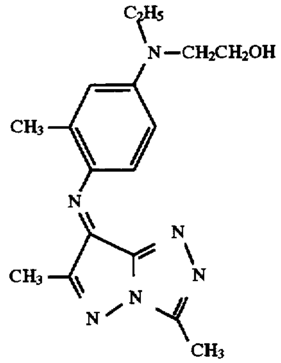

R-4

TABLE 1

| No. | Dye used | Dye (wt %) | Diethylene glycol (wt %) | Triethylene glycol monobutylether (wt %) | 1-propanol (wt %) | Ion-exchange water (wt %) | Light Fastness (%) | Color Tone | Storage Stability | Remarks |
|---|---|---|---|---|---|---|---|---|---|---|
| 1 | R-1 | 2 | 10 | 7 | 3 | 78 | 53 | ○ | ○ | Comp. |
| 2 | R-2 | 3 | 10 | 7 | 3 | 77 | 88 | Δ | ○ | Comp. |
| 3 | R-3 | 3 | 10 | 7 | 3 | 77 | 87 | ○ | X | Comp. |
| 4 | D-1 | 3 | 10 | 7 | 3 | 77 | 93 | ○ | ○ | Inv. |
| 5 | D-2 | 3 | 10 | 7 | 3 | 77 | 92 | ○ | ○ | Inv. |
| 6 | D-4 | 3 | 10 | 7 | 3 | 77 | 93 | ○ | ○ | Inv. |
| 7 | D-5 | 3 | 10 | 7 | 3 | 77 | 91 | ○ | ○ | Inv. |
| 8 | D-25 | 3 | 10 | 7 | 3 | 77 | 93 | ○ | ○ | Inv |
| 9 | D-26 | 3 | 10 | 7 | 3 | 77 | 92 | ○ | ○ | Inv. |
| 10 | D-31 | 3 | 10 | 7 | 3 | 77 | 93 | ○ | ○ | Inv. |

TABLE 2

| No. | Dye used | Dye (wt %) | Ethylene glycol (wt %) | Ethylene oxide-propylene oxide block copolymer (wt %) | Sodiumsulfo-naphthalene-formalin condensate (wt %) | Sodium-sulfo lignin (wt %) | Ion-exchange water (wt %) | Light Fastness (%) | Color Tone | Storage Stability | Remarks |
|---|---|---|---|---|---|---|---|---|---|---|---|
| 1 | R-4 | 5.5 | 4 | 0.5 | 4 | 2 | 84 | 89 | Δ | X | Comp. |
| 2 | D-1 | 5.5 | 4 | 0.5 | 4 | 2 | 84 | 96 | ○ | ○ | Inv. |
| 3 | D-2 | 5.5 | 4 | 0.5 | 4 | 2 | 84 | 97 | ○ | ○ | Inv. |
| 4 | D-6 | 5.5 | 4 | 0.5 | 4 | 2 | 84 | 94 | ○ | ○ | Inv. |
| 5 | D-7 | 5.5 | 4 | 0.5 | 4 | 2 | 84 | 95 | ○ | ○ | Inv. |
| 6 | D-9 | 5.5 | 4 | 0.5 | 4 | 2 | 84 | 95 | Δ | ○ | Inv. |
| 7 | D-10 | 5.5 | 4 | 0.5 | 4 | 2 | 84 | 93 | ○ | ○ | Inv. |
| 8 | D-19 | 5.5 | 4 | 0.5 | 4 | 2 | 84 | 93 | Δ | ○ | Inv. |
| 9 | D-23 | 5.5 | 4 | 0.5 | 4 | 2 | 84 | 90 | Δ | ○ | Inv. |
| 10 | D-24 | 5.5 | 4 | 0.5 | 4 | 2 | 84 | 91 | Δ | ○ | Inv. |

TABLE 3

| No. | Dye used | Dye (wt %) | Tripropylene glycol monomethylether (wt %) | Copolymer A (wt %) | Copolymer B (wt %) | Light Fastness (%) | Color Tone | Storage Stability | Remarks |
|---|---|---|---|---|---|---|---|---|---|
| 1 | R-4 | 3 | 91 | 5 | 1 | 88 | ○ | ○ | Comp. |
| 2 | D-1 | 3 | 91 | 5 | 1 | 95 | ○ | ○ | Inv. |
| 3 | D-2 | 3 | 91 | 5 | 1 | 95 | ○ | ○ | Inv. |
| 4 | D-4 | 3 | 91 | 5 | 1 | 94 | ○ | ○ | Inv. |
| 5 | D-5 | 3 | 91 | 5 | 1 | 93 | ○ | ○ | Inv. |
| 6 | D-7 | 3 | 91 | 5 | 1 | 94 | ○ | ○ | Inv. |
| 7 | D-12 | 3 | 91 | 5 | 1 | 92 | ○ | ○ | Inv. |
| 8 | D-13 | 3 | 91 | 5 | 1 | 93 | ○ | ○ | Inv. |
| 9 | D-16 | 3 | 91 | 5 | 1 | 90 | ○ | ○ | Inv. |
| 10 | D-24 | 3 | 91 | 5 | 1 | 91 | ○ | ○ | Inv. |

As is apparent from the above-mentioned results, it can be understood that the present invention is superior to the comparative inventions in terms all of light fastness, color tone and storage stability.

When an exclusive luster film MJSP4 (produced by Seiko Epson) was used in place of the super fine exclusive paper MJSP1 as a recording medium, same results were obtained.

The dyes of the present invention was used in a continuous ejectting test using the present printer too without any problems. Therefore, it was confirmed that the electro-mechanical conversion system of the ink of the present invention has high fidelity.

Example 2

Using each of ink components having compositions described in Tables 4 and 5 and an ink jet printer BJC-600J (produced by Canon, an electro-heat conversion type), a A4 size sample wherein an image was recorded on an exclusive color BJ paper (LC-101) for ink jet (produced by Canon) was obtained. Using this sample, light fastness, color tone and storage stability were evaluated. The results are shown in Tables 4 and 5. Incidentally, unit of each compound amount in Tables 4 and 5 is weight % of ink. In addition, the definition of evaluation criteria are the same as in Example 1.

TABLE 4

| No. | Dye used | Dye (wt %) | Glycerin (wt %) | N-Methyl-2-pyrrolidone (wt %) | 2-propanol (wt %) | Ion-exchange water (wt %) | Light Fastness (%) | Color Tone | Storage Stability | Re-marks |
|---|---|---|---|---|---|---|---|---|---|---|
| 1 | R-1 | 2 | 8 | 7 | 3 | 80 | 54 | O | O | Comp. |
| 2 | R-2 | 3 | 8 | 7 | 3 | 79 | 87 | Δ | O | Comp. |
| 3 | R-3 | 3 | 8 | 7 | 3 | 79 | 89 | O | X | Comp. |
| 4 | D-1 | 3 | 8 | 7 | 3 | 79 | 93 | O | O | Inv. |
| 5 | D-2 | 3 | 8 | 7 | 3 | 79 | 93 | O | O | Inv. |
| 6 | D-4 | 3 | 8 | 7 | 3 | 79 | 92 | O | O | Inv. |
| 7 | D-5 | 3 | 8 | 7 | 3 | 79 | 90 | O | O | Inv. |
| 8 | D-25 | 3 | 8 | 7 | 3 | 79 | 93 | O | O | Inv. |
| 9 | D-27 | 3 | 8 | 7 | 3 | 79 | 93 | O | O | Inv. |
| 10 | D-30 | 3 | 8 | 7 | 3 | 79 | 92 | O | O | Inv. |

TABLE 5

| No. | Dye used | Dye (wt %) | Glycerin (wt %) | Ethylene oxide-propylene oxide block copolymer (wt %) | Sodiumsulfo-naphthalene-formalin condensate (wt %) | Ion-exchange water (wt %) | Light Fastness (%) | Color Tone | Storage Stability | Re-marks |
|---|---|---|---|---|---|---|---|---|---|---|
| 1 | R-4 | 5 | 5 | 1 | 2 | 87 | 88 | Δ | X | Comp. |
| 2 | D-1 | 5 | 5 | 1 | 2 | 87 | 97 | O | O | Inv. |
| 3 | D-2 | 5 | 5 | 1 | 2 | 87 | 97 | O | O | Inv. |
| 4 | D-6 | 5 | 5 | 1 | 2 | 87 | 95 | Δ | O | Inv. |
| 5 | D-9 | 5 | 5 | 1 | 2 | 87 | 96 | O | O | Inv. |
| 6 | D-10 | 5 | 5 | 1 | 2 | 87 | 93 | O | O | Inv. |
| 7 | D-12 | 5 | 5 | 1 | 2 | 87 | 95 | Δ | O | Inv. |
| 8 | D-18 | 5 | 5 | 1 | 2 | 87 | 93 | O | O | Inv. |
| 9 | D-23 | 5 | 5 | 1 | 2 | 87 | 90 | Δ | O | Inv. |
| 10 | D-24 | 5 | 5 | 1 | 2 | 87 | 91 | Δ | O | Inv. |

As is apparent from the above-mentioned results, it can be understood that the present invention is superior to comparative inventions in terms of light fastness, color tone and storage stability.

In addition, in the present printer, malfunction of head when the ink was metamorphosed by heat was not observed. Accordingly, the ink of the present invention is compatible with electrically-heated conversion systems.

Example 3

Using each of the ink components having compositions described in Table 6, and an ink jet printer MJ-5000C (produced by Seiko Epson, an electro-mechanical conversion type), a magenta sample wherein an image was recorded on a paper MJSP1 exclusive for ink jet (produced by Seiko Epson) was obtained. Using aforesaid sample, light fastness and color tone, described as follows, were evaluated. Table 6 shows the results thereof.

Light fastness:

After the recorded samples were exposed for 24 hours to an Xenon Fade-O-meter, the reflection densities at a green light after and before the exposure were measured with PDA-65 (produced by Konica Corporation. The difference between before and after exposure was calculated as follows.

Light Fastness (%)=(Green light reflection density after exposure)×100/(Green light reflection density before exposure)

Color tone:

Using a PDA-65 (produced by Konica Corporation), the reflection densities of a blue light, a green light and a red light were measured. Relative blue light reflection density and relative red light reflection density when the reflective density of the green light was defined to be 1 were calculated, and evaluated according to the following criteria. O represents a magenta image having favorable color tone with little incorrect absorption in a blue light and red light wavelength region.

O: The relative blue light reflection density was less than 0.30 and the relative red light reflective density was less than 0.10.

Δb: The relative blue light reflection density was not less than 0.30 and the relative red light reflection density was less than 0.10.

Δr: The relative blue light reflection density was less than 0.30 and the relative red light reflection density was not less than 0.10.

X: The relative blue light reflection density was not less than 0.30 and the relative red light reflection density was not less than 0.10.

Incidentally, each compound amount in Table 6 is weight % based on the weight of ink jet recording ink. In Table 6, the structure of Comparative-1 and Surfactant-1 will be exhibited as follows.

Comparative-1: C.I. Acid Red 52

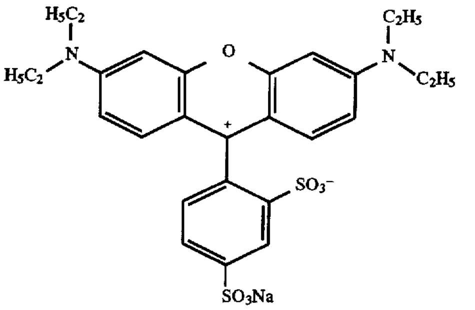

Surfactant-1: Surfynol 465 (produced by Air Products and Chemicals Inc.)

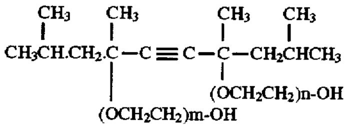

m + n = 10

As is apparent from the results of Table 6, the dyes of present invention and ink jet recording ink containing aforesaid dyes are excellent in terms of comparative dyes and jet recording inks containing aforesaid comparative dyes, are so favorable as to have little incorrect absorption on light and red light regions compared to the reflective density of the green light region.

The dyes of the present invention were also used in a continuous ejecting test using the present printer without any problems. Therefore, it was confirmed that the electromechanical conversion system of the ink of the present invention has high fidelity.

Example 4

Using ink components having compositions described in Table 7 and an ink jet printer BJC-600J (produced by Canon, an electro-heat conversion type), a sample wherein an image was recorded on an exclusive luster paper for ink jet (produced by Canon) was obtained. Using this sample, light fastness, color tone and storage stability were evaluated in the same manner as in Example 3. The results are shown in Table 7. Each compound amount in Table 7 is weight % of ink.

TABLE 6

| No. | Dye Number | Amount of Dye | Solvent 1 | Solvent 2 | Surfactant 1 | Ion-exchange water | Light Fastness | Color Tone | Remarks |
|---|---|---|---|---|---|---|---|---|---|
| 1 | Comp.1 | 1.4 | 19.0 | 9.0 | 0.6 | 70.0 | 29 | ○ | Comp. |
| 2 | I-1 | 1.4 | 19.0 | 9.0 | 0.6 | 70.0 | 98 | ○ | Inv. |
| 3 | I-2 | 1.4 | 19.0 | 9.0 | 0.6 | 70.0 | 93 | ○ | Inv. |
| 4 | I-3 | 1.4 | 19.0 | 9.0 | 0.6 | 70.0 | 95 | ○ | Inv. |
| 5 | I-4 | 1.4 | 19.0 | 9.0 | 0.6 | 70.0 | 96 | ○ | Inv. |
| 6 | I-5 | 1.4 | 19.0 | 9.0 | 0.6 | 70.0 | 98 | ○ | Inv. |
| 7 | I-8 | 1.4 | 19.0 | 9.0 | 0.6 | 70.0 | 96 | ○ | Inv. |
| 8 | I-9 | 1.4 | 19.0 | 9.0 | 0.6 | 70.0 | 94 | ○ | Inv. |
| 9 | I-10 | 1.4 | 19.0 | 9.0 | 0.6 | 70.0 | 95 | ○ | Inv. |
| 10 | I-11 | 1.4 | 19.0 | 9.0 | 0.6 | 70.0 | 96 | ○ | Inv. |
| 11 | I-16 | 1.4 | 19.0 | 9.0 | 0.6 | 70.0 | 96 | ○ | Inv. |
| 12 | I-18 | 1.4 | 19.0 | 9.0 | 0.6 | 70.0 | 91 | ○ | Inv. |
| 13 | I-20 | 1.4 | 19.0 | 9.0 | 0.6 | 70.0 | 90 | ○ | Inv. |
| 14 | I-26 | 1.4 | 19.0 | 9.0 | 0.6 | 70.0 | 87 | ○ | Inv. |
| 15 | I-31 | 1.4 | 19.0 | 9.0 | 0.6 | 70.0 | 88 | ○ | Inv. |
| 16 | I-36 | 1.4 | 19.0 | 9.0 | 0.6 | 70.0 | 85 | ○ | Inv. |
| 17 | I-38 | 1.4 | 19.0 | 9.0 | 0.6 | 70.0 | 87 | ○ | Inv. |
| 18 | I-40 | 1.4 | 19.0 | 9.0 | 0.6 | 70.0 | 85 | ○ | Inv. |
| 19 | I-41 | 1.4 | 19.0 | 9.0 | 0.6 | 70.0 | 86 | ○ | Inv. |
| 20 | I-43 | 1.4 | 19.0 | 9.0 | 0.6 | 70.0 | 89 | ○ | Inv. |

Solvent 1: Diethylene glycol
Solvent 2: Triethylene glycol monobutyl ether

TABLE 7

| No. | Dye Number | Amount of Dye | Solvent 3 | Solvent 4 | Solvent 5 | Ion-exchange water | Light Fastness | Color Tone | Remarks |
|---|---|---|---|---|---|---|---|---|---|
| 21 | Comp.1 | 2.0 | 8.0 | 7.0 | 3.0 | 80.0 | 34 | ○ | Comp. |
| 22 | I-1 | 2.0 | 8.0 | 7.0 | 3.0 | 80.0 | 100 | ○ | Inv. |
| 23 | I-2 | 2.0 | 8.0 | 7.0 | 3.0 | 80.0 | 96 | ○ | Inv. |
| 24 | I-3 | 2.0 | 8.0 | 7.0 | 3.0 | 80.0 | 99 | ○ | Inv. |
| 25 | I-4 | 2.0 | 8.0 | 7.0 | 3.0 | 80.0 | 100 | ○ | Inv. |
| 26 | I-5 | 2.0 | 8.0 | 7.0 | 3.0 | 80.0 | 100 | ○ | Inv. |
| 27 | I-8 | 2.0 | 8.0 | 7.0 | 3.0 | 80.0 | 99 | ○ | Inv. |
| 28 | I-10 | 2.0 | 8.0 | 7.0 | 3.0 | 80.0 | 99 | ○ | Inv. |
| 29 | I-11 | 2.0 | 8.0 | 7.0 | 3.0 | 80.0 | 99 | ○ | Inv. |
| 30 | I-12 | 2.0 | 8.0 | 7.0 | 3.0 | 80.0 | 98 | ○ | Inv. |
| 31 | I-16 | 2.0 | 8.0 | 7.0 | 3.0 | 80.0 | 99 | ○ | Inv. |
| 32 | I-21 | 2.0 | 8.0 | 7.0 | 3.0 | 80.0 | 95 | ○ | Inv. |
| 33 | I-24 | 2.0 | 8.0 | 7.0 | 3.0 | 80.0 | 97 | ○ | Inv. |
| 34 | I-26 | 2.0 | 8.0 | 7.0 | 3.0 | 80.0 | 90 | ○ | Inv. |
| 35 | I-28 | 2.0 | 8.0 | 7.0 | 3.0 | 80.0 | 91 | ○ | Inv. |
| 36 | I-33 | 2.0 | 8.0 | 7.0 | 3.0 | 80.0 | 89 | ○ | Inv. |
| 37 | I-42 | 2.0 | 8.0 | 7.0 | 3.0 | 80.0 | 85 | ○ | Inv. |
| 38 | I-46 | 2.0 | 8.0 | 7.0 | 3.0 | 80.0 | 87 | ○ | Inv. |
| 39 | I-57 | 2.0 | 8.0 | 7.0 | 3.0 | 80.0 | 100 | ○ | Inv. |
| 40 | I-59 | 2.0 | 8.0 | 7.0 | 3.0 | 80.0 | 100 | ○ | Inv. |
| 41 | I-60 | 2.0 | 8.0 | 7.0 | 3.0 | 80.0 | 99 | ○ | Inv. |

Solvent 3: Glycerin
Solvent 4: 2-pyrrolidone
Solvent 5: 1,5-pentanediol

As is apparent from the results of Table 7, the dyes of the present invention and ink jet recording ink containing aforesaid dyes are excellent in terms of comparative dyes and ink jet recording inks containing aforesaid comparative dyes, and are so favorable as to have little incorrect absorption in the blue light and red light regions when compared to the reflective density of the green light region. In addition, in the present printer, malfunctions of the head when the ink was metamorphosed by heat was not observed. Accordingly, the ink of the present invention is compatible with electrically-heated conversion systems.

What is claimed is:

1. A recording method comprising the step of:

ejecting an ink jet recording ink on an ink receiving material using an ink jet printer, the ink comprising a dye represented by the following Formula (1):

Formula (1)

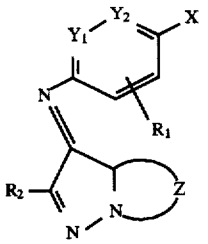

wherein $R_1$ represents a hydrogen atom, a halogen atom, an alkyl group, a cycloalkyl group, a cyano group, an alkoxxy group, an aryl group, an aryloxy group, an aralkyl group, an alkylsulfinyl group, an acylamino group, a sulfonylamino group, a ureido group, an alkylthio group, an alkoxycarbonyl group, a carbamoyl group, an acyl group, an amino group, an alkylsulfonyl group or a sulfamoyl group; and $R_2$ represents a hydrogen atom, a halogen atom, an alkyl group, a cycloalkyl group, a cyano group, an alkoxy group, an aryl group, an aryloxy group, an aralkyl group, an alkylsulfinyl group, an acylamino group, a sulfonylamino group, a ureido group, an alkylthio group, an alkoxycarbonyl group, a carbamoyl group, an acyl group, an amino group, an alkylsulfonyl group or a sulfamoyl group; X represents —OH or —$NR_3R_4$, in which $R_3$ and $R_4$ independently represent a hydrogen atom, an alkyl group, a cycloalkyl group, an alkenyl group, an alkinyl group, an aralkyl group, an aryl group or a heterocyclic ring, provided that $R_3$ and $R_4$ may combine with each other to form a ring or $R_3$ and $R_1$ may combine with each other to form a ring; $Y_1$ and $Y_2$ independently represent nitrogen or CR in which R represents a hydrogen atom, an alkyl group or an acylamino group, provided that at least one of $Y_1$ and $Y_2$ is nitrogen; Z represents an atomic group necessary to form a substituted or unsubstituted 5- or 6-membered nitrogen-containing heterocyclic ring, provided that the heterocyclic ring may be condensed with another ring; and at least one of $R_2$ and the substituent on Z has a Hammett σp value of −0.3 to 1.0, provided that at least one of $R_1$, $R_2$, $R_3$, $R_4$, R and the substituent on the heterocyclic ring represented by Z has a group having a sulfonic acid group or its salt group or a carboxylic acid group or its salt group, wherein said ink jet recording ink contains water in an amount of 1.0 to 98.9% by weight, a water soluble organic solvent in an amount of 1.0 to 98.9% by weight and said dye in an amount of 0.1 to 20.0% by weight.

2. The method of claim 1, wherein said at least one of $R_2$ and the substituent on Z has a Hammett σp value of −0.05 to 1.0.

3. The method of claim 1, wherein said dye is represented by the following Formula I:

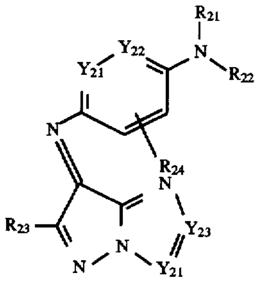

wherein $R_{23}$ represents an alkyl group having a Hammett σp value of −0.3 to 0.5; $R_{24}$ represents a hydrogen atom, an alkyl group, an alkoxy group, a halogen atom, an acylamino group, a ureido group, an alkoxycarbonyl group or a sulfonylamino group; $R_{21}$ represents a hydrogen atom, an alkyl group, an alkenyl group, an alkinyl group or an aralkyl group, $R_{22}$ represents a hydrogen atom, an alkyl group, an alkenyl group, an alkinyl group, an aralkyl group, an aryl group or a heterocyclic group, provided that $R_{21}$ and $R_{22}$ may combine with each other to form a ring; $Y_{21}$ and $Y_{22}$ independently represent nitrogen or CR in which R represents a hydrogen atom, an alkyl group, an alkoxy group, a halogen atom, an acylamino group, a ureido group, an alkoxycarbonyl group or a sulfonylamino group, provided that at least one of $Y_{21}$ and $Y_{22}$ represents nitrogen; $Y_{23}$ and $Y_{24}$ independently represent nitrogen or CR' in which R' represents an alkyl group, an alkenyl group, an alkinyl group or an aralkyl group, provided that at least one of $Y_{23}$ and $Y_{24}$ represents nitrogen; and at least one of $R_{21}$, $R_{22}$, $R_{23}$, $R_{24}$, R and R' has a sulfonic acid group, a carboxyl group or a salt thereof as a substituent.

* * * * *